United States Patent
Hamze

(10) Patent No.: US 11,409,420 B2
(45) Date of Patent: Aug. 9, 2022

(54) DYNAMIC MODELER

(71) Applicant: Hayssam Hamze, Dubai (AE)

(72) Inventor: Hayssam Hamze, Dubai (AE)

(*) Notice: Subject to any disclaimer, the term of this patent is extended or adjusted under 35 U.S.C. 154(b) by 0 days.

(21) Appl. No.: 17/129,808

(22) Filed: Dec. 21, 2020

(65) Prior Publication Data

US 2021/0303118 A1   Sep. 30, 2021

Related U.S. Application Data

(63) Continuation-in-part of application No. 16/835,066, filed on Mar. 30, 2020.

(51) Int. Cl.
  G06F 3/0484   (2022.01)
  G06F 16/27   (2019.01)

(52) U.S. Cl.
  CPC ............ *G06F 3/0484* (2013.01); *G06F 16/27* (2019.01)

(58) Field of Classification Search
  CPC ................................ G06F 3/0484; G06F 16/27
  See application file for complete search history.

(56) References Cited

U.S. PATENT DOCUMENTS

| | | | |
|---|---|---|---|
| 10,810,023 | B1 | 10/2020 | Hamze et al. |
| 11,182,177 | B2 | 11/2021 | Hamze |
| 11,226,843 | B2 | 1/2022 | Hamze |
| 2014/0136255 | A1 | 5/2014 | Grabovski et al. |
| 2015/0154528 | A1 | 6/2015 | Tavakol |
| 2017/0006141 | A1 | 1/2017 | Bhadra et al. |
| 2017/0083386 | A1 | 3/2017 | Wing et al. |
| 2017/0235848 | A1* | 8/2017 | Van Dusen ............ G06F 16/904 705/12 |
| 2018/0181716 | A1 | 6/2018 | Mander et al. |
| 2019/0013948 | A1* | 1/2019 | Mercuri .................. G06F 16/27 |
| 2020/0074832 | A1* | 3/2020 | Vincent ............ G06Q 10/06316 |
| 2020/0304378 | A1 | 9/2020 | Choi et al. |

(Continued)

OTHER PUBLICATIONS

Georgakopoulous et al., "An Overview of Workflow Management: From Process Modeling to Workflow Automation Infrastructure," Kluwer Academic Publishers, 1995, pp. 119-153.

(Continued)

*Primary Examiner* — Maryam M Ipakchi
(74) *Attorney, Agent, or Firm* — Fish & Richardson P.C.

(57) ABSTRACT

Methods, systems, and apparatus, including computer programs encoded on computer storage media, for dynamically modeling a page using dynamic data. One of the methods includes receiving, at a dynamic modeling system, a dynamic input request comprising data characterizing a single dynamic final event of a main task; automatically detecting one or more discrepancies in the single dynamic final event; generating, in response to the one or more discrepancies, a run-time task interface that identifies one or more dynamic options for responding to the one or more discrepancies, comprising: automatically generating a new child task of the main task for addressing the one or more discrepancies; and automatically determining a recipient resource of the new child task; sending, to the recipient resource, data characterizing the run-time task interface; receiving, from the recipient resource, data characterizing the completed child task; and automatically validating one or more fields of the completed child task.

13 Claims, 11 Drawing Sheets

(56) References Cited

U.S. PATENT DOCUMENTS

2020/0380556 A1  12/2020  Ainscough et al.
2021/0303319 A1   9/2021  Hamze
2021/0303345 A1   9/2021  Hamze
2021/0303369 A1   9/2021  Hamze

OTHER PUBLICATIONS

Office Action in U.S. Appl. No. 17/191,656, dated Jul. 27, 2021, 10 pages.
PCT International Search Report and Written Opinion in International Appln No. PCT/CY2021/000001 dated Jun. 23, 2021, 15 pages.
wikipedia.com [online], "Smart Contract—Wikipedia" Oct. 25, 2018, retrieved on Nov. 8, 2019, retrieved from URL <https://en.wikipedia.org/w/index.php?title=Smart_contractor&oldid=865760563, 6 pages.

* cited by examiner

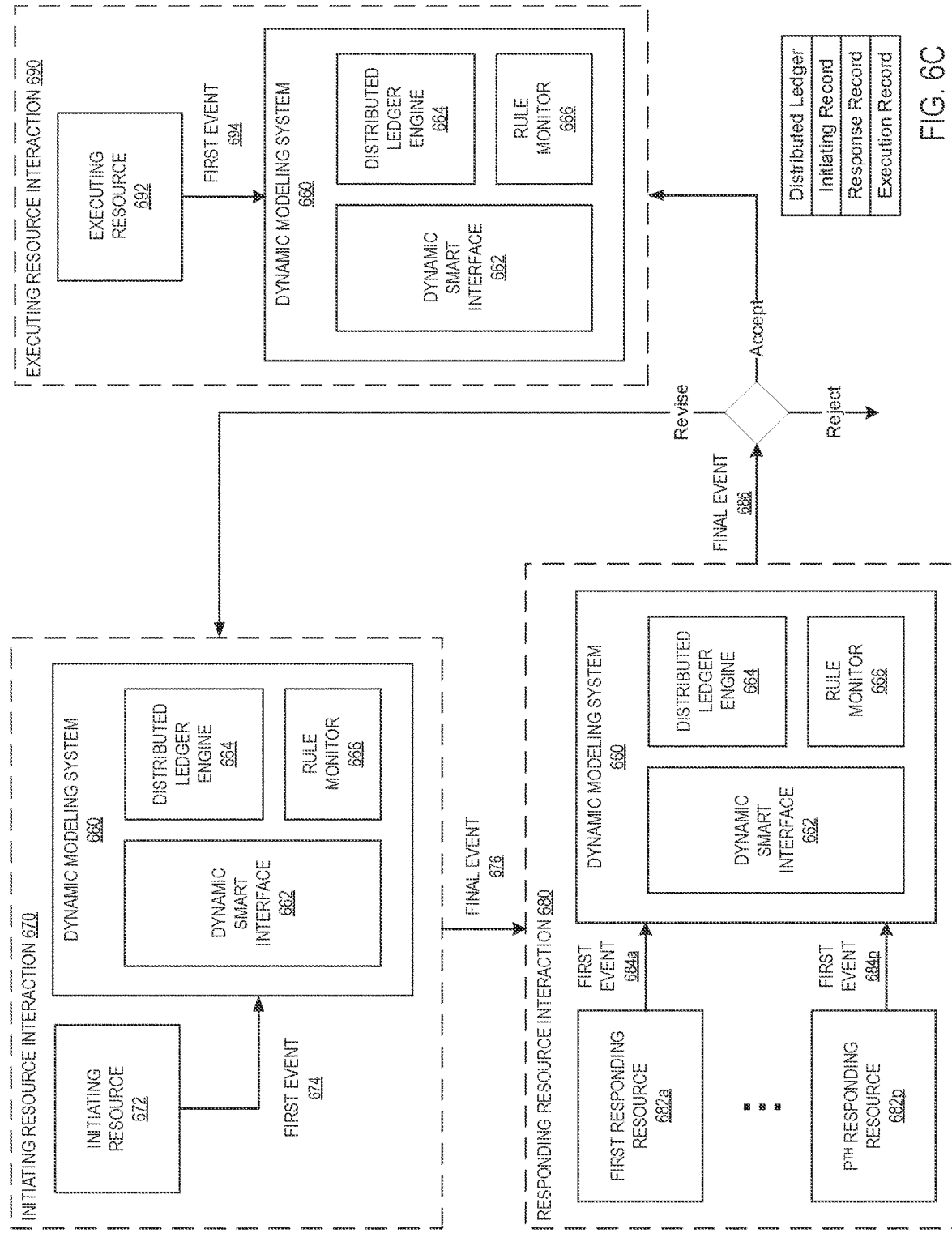

DYNAMIC MODELER

CROSS-REFERENCE TO RELATED APPLICATIONS

This application is a continuation-in-part application of, and claims priority to, U.S. patent application Ser. No. 16/835,066, filed on Mar. 30, 2020. The disclosure of the foregoing application is incorporated here by reference.

BACKGROUND

This specification relates to interactive user programs.

Computing platforms and network-connected personal computing devices allow different users to create and interact with content across multiple devices. Some conventional platforms manage the distribution of content to users and process user commands to facilitate various actions. In some conventional platforms, a user must send multiple user commands across multiple interfaces presented to the user by the platform to complete a given task.

SUMMARY

This specification describes a dynamic modeler for dynamic user interface interaction on a single platform by configuration only. The dynamic modeler can generate, for all applications, i) a single shared first event, ii) a single shared dynamic cascading filter, and iii) a single shared final event, powered by an application's context and based on a resource event triggering a smart task to auto-generate the next tasks and their correspondent institutions and resources. The dynamic modeler can provide set standardized reporting, reconciliation, and output documents. These features can achieve an integrated-solution platform ecosystem for IoT and non-IoT resources.

The features of the dynamic modeler include: 1.) Dynamic Smart Interface, which can include a Home Page, a Dynamic Form which includes a cascading data structure with associated Dynamic Controls and Data Load, and Rule Options (e.g., right click, burger menu, or action prompt list), which can support API inputs, Voice Commands, and/or one or more Dynamic Interaction Types (i.e., input types that the generated interface can accept); 2.) Dynamic Interaction Types, which can include a Single Dynamic First Event and a Single Dynamic Final Event (which can each be received from Voice, API, and/or Clicks); 3.) Dynamic Process Manager, which can include a Rule Monitor, a Smart Task Generator (for one or more of M-Tasks, A-Tasks, L-Tasks, T-Tasks, CD-Tasks, FT-Tasks, or C-Tasks), a Smart Assistant, and a Task Chain system; 4.) Contextual Dynamic Data, which can include one or more of an output model profile, intelligent resource interaction (IRI), or a task chain contract; and 5.) Dynamic Report Viewer, which can include Set Standardized Reporting, dynamic reconciliation of contextually connected data, and output documents.

In some implementations, the dynamic process manager, e.g., an intelligent resource interaction engine of the dynamic process manager, can maintain one or more machine learning models that have been trained using contextual dynamic data of the dynamic modeler. This process is described in more detail below with respect to FIG. 6B.

In some implementations, the task chain system, e.g., a distributed ledger engine of the task chain system, maintains records of transactions and resources of the dynamic modeler in an immutable distributed ledger for future reference. That is, the task chain system can generate a task chain contract, as described in more detail below, and the distributed ledger engine can write the task chain contract to a distributed ledger.

For a particular transaction, the task chain system can store contextual dynamic data for the transaction in a "task chain contract" in the distributed ledger. The task chain contract corresponding to each transaction can include smart terms, which parties of the transaction can use to bring claims against respective other parties of the transaction. Every smart term and claim can be linked with a warrantor and a beneficiary at any stage in the current transaction, or at any stage in a different transaction that is related to the current transaction, to ensure that there is no need to reconcile a discrepancy manually. After the smart terms of the transaction are determined, e.g., using a T-Task and/or a CD-Task and confirmed using a decision C-Task, the dynamic modeler can generate a task chain contract that includes the agreed-upon smart terms, optionally with the associated contextual data from each phase of the transaction. The dynamic modeler can then save the task chain contract to one or more distributed ledgers, e.g., using a distributed ledger engine. The contextual distributed ledger record can be retrieved by each party from the distributed ledger when required. This process is described in more detail below with respect to FIG. 8 and FIG. 9.

In some implementations, the contextual distributed ledger record includes i) transaction records that record contextual dynamic data corresponding to transactions of the dynamic modeler and ii) resource records that record contextual dynamic data corresponding to resources of the dynamic modeler.

The dynamic modeler can include a home page that includes both i) a Central Task Hub for all task types of the dynamic modeler, e.g., main tasks (M-Tasks) and communicator tasks (C-Tasks) and ii) one or more action menus. Based on a configuration-only setup with no developer input, the dynamic modeler is designed to read and write from multiple databases, allowing IoT and non-IoT resources to collaborate on different devices on a single platform. The platform can support a wide range of device resources, including, e.g., mobile, desktop, and IoT devices.

This collaboration between a sender and a recipient is maintained by the process manager with its dynamic rule monitor to auto-generate a Main Task when a single or a set of conditions are met, based on the output model profile or IRI, offering the targeted resources a single or a set of rule options to allow the execution of a task by an update from an API, a voice command, or a click type, followed by a single dynamic final event to trigger the task generator and set a next new Main Task.

Or, alternatively, the resource can trigger a C-Task to create a targeted field action form to select specific fields from the M-Task page that needs to be actioned against. This C-Task is sent to one or more recipients, e.g., other users or IoT devices, to execute the necessary actions. Once executed, the initiating user can validate and post the requested data back into the M-Task and trigger the necessary corrective action between a mobile device and desktop, without the need of manual mapping, thereby ensuring data integrity.

The dynamic process manager queries the modeler's dynamic data context, allowing an API to write or read from a task chain contract in real time whenever required by the process manager based on the rule monitor.

The above features allow the platform to continuously render any dynamic output model. By following the configured processes and rules as required by the resource, the platform can maintain traceability along the process flow. The configured processes can be dynamic; that is, according to a particular configuration of the dynamic modeler, the configured processes can be dynamic in response to particular contextual data. The resource can be a user, an IoT device, or any other appropriate resource that interacts with the platform. The dynamic control load and dynamic data load features ensure that the resource is only presented with options and content that are necessary to interact with and update a particular output model based on the contextual dynamic data.

EXAMPLES

As a particular example, the interactive program can be a project management program, where, using one or more Main Tasks, one or more users or IoT devices can collaborate to complete a project. To begin the project, a resource can start with a planning Main Task supported by IM, which will assist by comparing similar current and historic projects to confirm budgeted allocations are viable and optimized. The resource completing the planning Main Task can then match available and suitable resources based on the project requirements and issue C-Tasks to the available resources to accept or reject their involvement in the project which will be posted back into the planning Main Task for final review by the resource. In some implementations, the different resources associated with the project can link up with one another on the dynamic modeling platform using an L-Task; this process is described in more detail with reference to FIG. 9.

If the rule monitor determines that there is a discrepancy in the received response to a particular task, it will prompt or escalate to the applicable resource and give the resource one or more rule options (e.g., to reduce, increase the resources, change the budget, amend project phases etc.). As a particular example, a first resource might submit a request to begin a project that will cost a certain amount of money. This can trigger the creation of an M-Task for a second user to approve the request. The second resource might approve the request, but the rule monitor can process the response of the generated M-Task and determine that the there is a discrepancy between the response and the output model profile of the dynamic modeler. For example, the rule monitor can flag the response of the second resource because the amount of money is so high that the request requires further approval by a third resource. The rule monitor can then automatically generate an M-Task or a C-Task for the third resource to review the request.

As another particular example, the interactive program can be a commercial transaction program that manages a transaction between a customer and a business. An offer or enquiry can be initiated, e.g., via an M-Task, by an initiating resource of the transaction, e.g., a resource corresponding to the customer or the business. On the save of the M-Task, a smart assistant of the dynamic modeler can generate one or more T-Tasks, which can generate smart terms for the transaction, where each resource of the transaction can review and approve each term in the smart terms (e.g., credit terms, payment terms, etc.). In some implementations, the smart assistant of the dynamic modeler can provide prompts to the resources of the transaction in order to accept, reject, or revise the smart terms of the transaction via decision C-Tasks.

After the smart terms are confirmed, the dynamic modeler can use a set of payment terms in the smart terms to generate one or more FT-Tasks that each correspond to a respective FT-Institution. Each M-task in the transaction can be assigned to a respective resource associated with the transaction while each FT-Task can be assigned to an FT-Institution, which via the FT-Tasks can have access to review the necessary data of the M-Tasks, T-Tasks, and/or CD-Tasks of the transaction as needed. The FT-Institution can then execute or guarantee a future payment on behalf of a paying resource associated with the transaction. Thus, the customer, business, and FT-Institutions can leverage the capabilities of the task chain interaction with the dynamic modeler to establish trust, based on the set transactional task chain.

Once resources of the dynamic modeler corresponding to the customer and the business have both accepted smart terms for the transaction, e.g., using C-Tasks, then the task chain system can generate a task chain contract, which can be written to a distributed ledger recording the transactional task chain; this process is described in more detail below with reference to FIG. 8. The smart terms can be part of the transaction flow (in a task chain context) of the dynamic modeler, and by saving them to a distributed ledger, i.e., in a "task chain contract," the dynamic modeler can ensure integrity of the set terms during the transaction. If at any point in the transaction the Rule Monitor evaluates a discrepancy between the conduct of the parties in the transaction and the set terms recorded in the task chain contract, it will suggest or trigger a Rule Option, to apply a corrective 'T-Task' which can be auto-assigned to the correct resource pursuant to the terms recorded in the task chain contract.

Advantages

With a dynamic single request input, a dynamic modeler can pass contextual parameterized commands across any process and issue a render command to produce a window dynamically, which will contain all of the required controls, awaiting a user event which then triggers commands. The list of controls (e.g., drop down, save, etc.) is always contextual and does not require any developer input.

Particular embodiments of the dynamic modeler described in this specification can be implemented so as to realize one or more of the following advantages.

The platform is dynamic. This means that the modeler can auto-adjust its process model output, which is based on i) the output model profile, ii) a resource type, iii) regional or institution regulations, and/or iv) computed fields which have been created by 'configuration only' without the need for additional computer language, enabling continuous integration of multiple applications onto the single platform. The platform can also leverage one or more machine learning models to learn patterns from historical data. For example, the platform can process historical data generated by both users of the platform and IoT devices of the platform using a machine learning model to predict a behavior of the users and IoT devices in the future.

The dynamic modeler can thus generate a fully contextual task (e.g., an M-Task, a T-Task, a CD-Task, an FT-Task, an L-Task, an A-Task, or a C-Task) with its set of correspondent resources which are supplied with a full transaction context and set of restrictions. The modeler is furthermore supported by transaction tracking features for all tasks, while limiting the available tracking features for each resource to the context which the resource should have access to.

The dynamic modeler enables the devices and users of the system to communicate via C-Tasks on past, current, or upcoming tasks. The C-Tasks can target a specific step or a specific field within a step of an M-Task to generate a form or request an action. The feedback in response to the C-Task can be auto-posted to the M-Task or subject to sender confirmation after processing the response using the Rule Monitor, based on the task chain contract terms. The dynamic modeler can then create a new task with its specific Rule Options. The interaction between M-Tasks and C-Tasks, for example using an integrated chat extension, allows users and other resources to seamlessly interact to complete the tasks.

In particular, a team that uses the dynamic modeling system might not need to hire developers to modify the system for the particular needs of the team or integrate any $3^{rd}$ party APIs. Once the necessary context data is obtained, the content of each output model generated by the dynamic modeler can be automatically generated by the system to include all data necessary for the particular use case without any additional engineering or hard-coding of use-case specific information. This can allow projects to be completed more quickly and with fewer errors, as developer input can introduce delay, inaccuracy, and subjectivity.

In this specification, a platform is "integrated-solution" if a resource of the platform can execute tasks on the platform without needing to use any other applications or platforms. For example, some techniques described in this specification allow for different business lines within the same company, as well as different businesses collaborating on the same transaction, to communicate with each other using a single platform. All information necessary for each member of each business line to complete a respective task is available on the platform, and so no additional exchange of information, e.g., through other applications such as email or instant messaging, is required. That is, the user does not have to collect and synthesize information from multiple different sources, e.g., juggling multiple emails, instant messages, and notifications from respective platforms; the user only needs to interact with a single platform to receive all required information.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6C and 7 are block diagrams of example interactions between a dynamic modeling system and resources of the dynamic modeling system.

Like reference numbers and designations in the various drawings indicate like elements.

DETAILED DESCRIPTION

Figure 1:
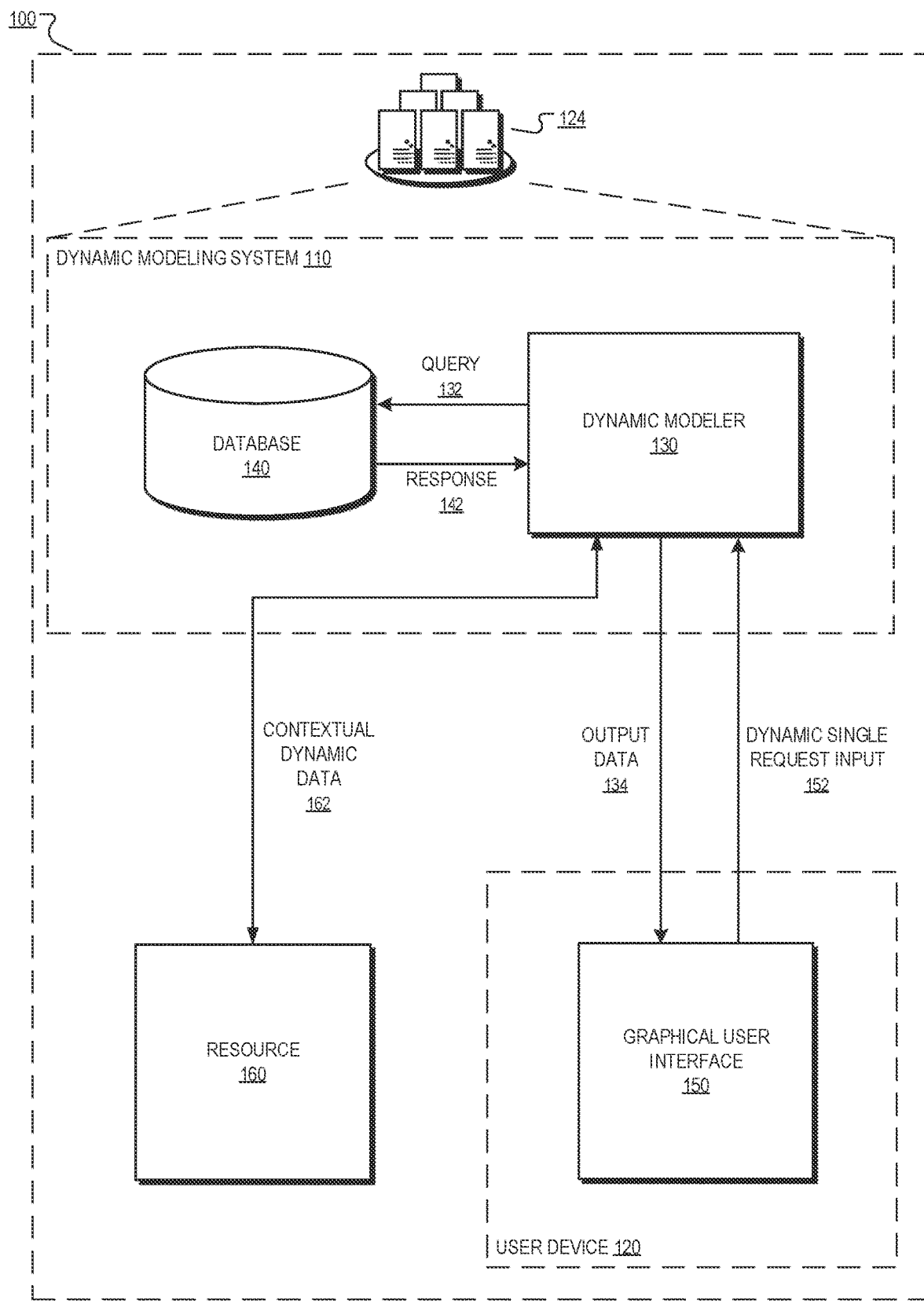
FIG. 1 is a block diagram of an example system.

FIG. 1 is a block diagram of an example system 100. The system 100 includes a dynamic modeling system 110, a user device 120, and a resource 160. The dynamic modeling system 110 generates output of an interactive user program to be displayed for a user on the user device 120.

The dynamic modeling system 110 includes one or more databases 140 and a dynamic modeler 130. In some implementations, the dynamic modeling system 110 can be hosted within a data center 124, which can be a distributed computing system having hundreds or thousands of computers in one or more locations. In some other implementations, certain portions of the dynamic modeling system 110, e.g., the dynamic modeler 130, can be executed locally on the user device 120, while other portions of the dynamic modeling system 110, e.g., the database 140, are hosted within the data center 124.

The user device 120 can include personal computers, tablet devices, mobile phones, or other computing devices. The user device 120 includes a display device that can present a graphical user interface 150. The graphical user interface 150 can display a current page of the interactive user program. For example, the graphical user interface 150 can display a home page of the interactive user program that includes a list of one or more tasks that have been assigned to the user. Each task can be a part of a sequence process that defines a transaction. Example tasks and transactions are discussed below in reference to FIG. 2.

The user can interact with the graphical user interface 150 to send a dynamic single request input 152 to the dynamic modeler 130. The dynamic single request input 152 can be one of multiple different dynamic interaction types, e.g., a single dynamic first event or a single dynamic final event, which are discussed in more detail below with reference to FIG. 2. The dynamic single request input 152 can be received, e.g., from a voice command, an API command, or a click or other interaction with an input device of the user device 120. For example, the user device 120 can include one or more input devices for receiving user input including, e.g., a keyboard, mouse, or touch sensitive display.

The dynamic single request input 152 can include data characterizing the interaction of the user with the current page displayed on the graphical user interface 150. As a particular example, the current page can be a home page that includes a task hub that i) lists one or more tasks assigned to the user and ii) allows a user to generate new tasks. In this case, the user can send a dynamic single request input 152 by selecting one of the tasks listed on the page. Here, the dynamic single request input 152 can include data characterizing the particular task that the user selected using an input device of the user device 120.

The dynamic modeler 130 can use the data included in the dynamic single request input 152 to generate a task to send a query 132 to one or more databases 140. Upon receiving a response 142 to the query 132 from the one or more databases 140, the dynamic modeler 130 can use data included in the response 142 to dynamically generate an output model according to the particular user and the dynamic single request input 152 that was received. For example, the modelled output can present a set of prompts for the user to complete a task that is identified in the dynamic single request input 152. This process is described in more detail below with reference to FIG. 2. In some implementations, the dynamic modeler 130 can provide one or more prompts to the user using a smart assistant, where the prompts are determined using contextual dynamic data for the current task or transaction; this process is discussed in more detail below with reference to FIG. 7.

The dynamic modeler 130 can then send output data 134 to the user device 120. The output data 134 includes data characterizing the modelled output. For example, the output data 134 can include render data that can be used by the graphical user interface 150 to render the modelled output for the user.

The dynamic modeler 130 can also interact with the resource 160 in order to update contextual dynamic data 162 of the dynamic modeling system 110 that is stored in the database 140. The resource 160 can be any appropriate resource of the dynamic modeling system 110, e.g., another user device, an IoT device, a non-IoT device, etc. The interaction between the dynamic modeling system 110 and the various resources 160 of the dynamic modeling system 110 is described in more detail below.

Figure 2:
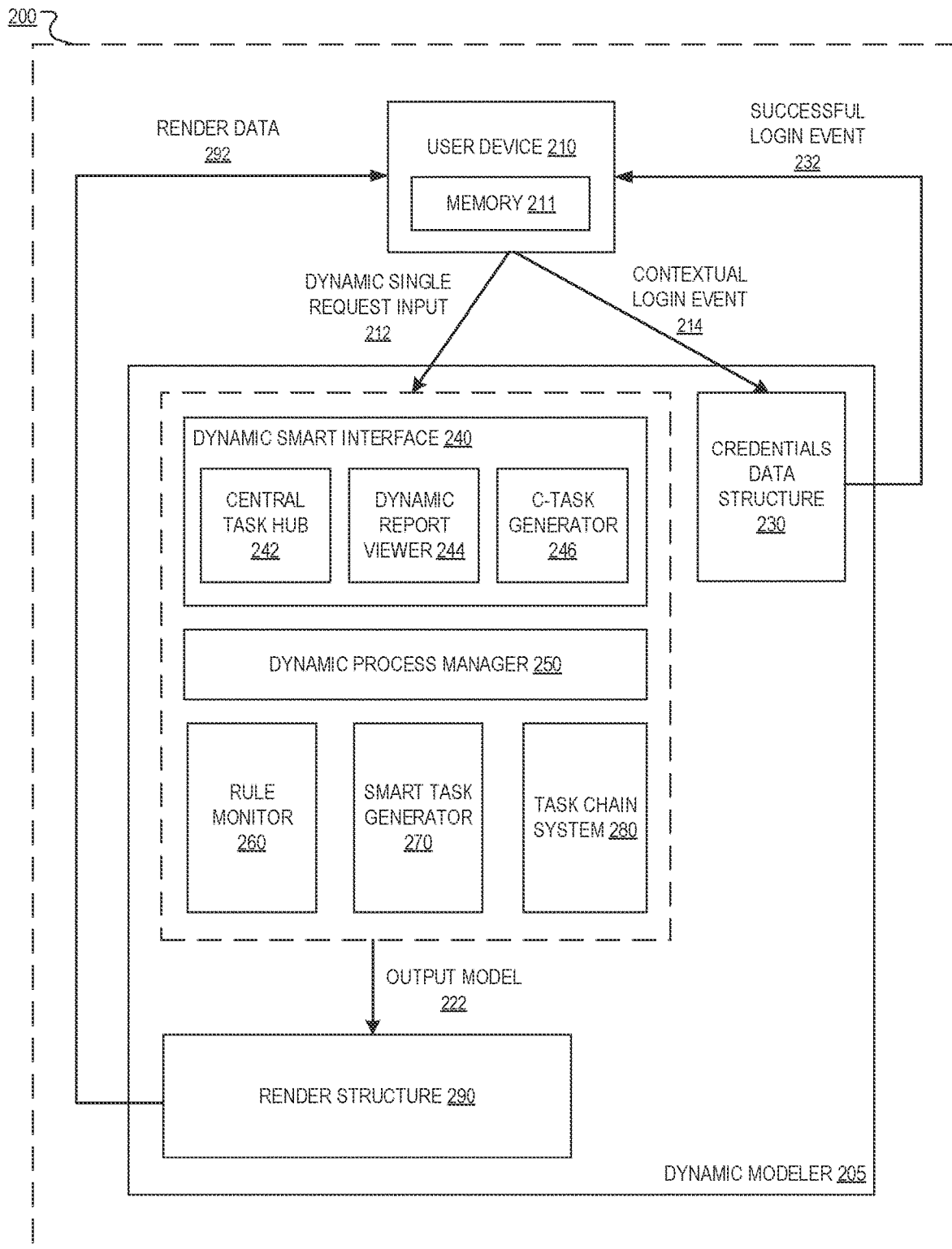
FIG. 2 is a block diagram of an example dynamic modeler interacting with a user device.

FIG. 2 is another diagram of an example dynamic modeling system 200 that includes a dynamic modeler 205 interacting with a user device 210.

The user device 210 can send events to the dynamic modeler 205 to allow a user to interact with a program to execute one or more tasks.

As a particular example, the user can provide credentials, e.g., a username and password, to the user device 210. For example, the username and password corresponding to the user can be established when the user is activated on the dynamic modeling system 200, e.g., using an A-Task. The user device 210 can then send a contextual login event 214 to the dynamic modeler 205, with contextual dynamic data that includes the credentials of the user. A credentials data structure 230 of the dynamic modeler 205 can receive the contextual login event 214 and use the contextual login event 214 to validate the credentials of the user. Upon validation of the user's credentials, the credentials data structure 230 can send a successful login event 232 to the user device 210. The successful login event 232 can include data that allows the user device 210 to interact with the dynamic modeler 205 as a fully-credentialed user. The successful login event 232 can also include data for rendering a landing page that the user device 210 can use to render the first page of the program that the user will see.

In some implementations, the contextual login event 214 can include unique identification data that is associated with the user in the dynamic modeling system 200. That is, the unique identification data is maintained by the system 200 in a user profile of the user. The credentials data structure 230 can use the unique identification data to authenticate the user. User profiles are discussed in more detail below. In some implementations, the unique identification data of the user is stored in a distributed ledger of the dynamic modeling system 200 in a record corresponding to the user, e.g., in a "resource record" of the distributed ledger as described above.

The user device 210 can include a memory 211 that can store data related to the dynamic modeler 205, e.g., contextual dynamic data that is sent to the user device with the login event 232. While the dynamic modeler 205 is depicted as separate from the user device 210, in some implementations, the dynamic modeler 205 is a part of the user device 210; in this case, the memory 211 of the user device 210 can enable the operations of the dynamic modeler 205.

For example, the landing page can be a home page that includes a Central Task Hub and one or more action menus.

The home page of the dynamic modeler 205 can be a "single" home page, i.e., a home page that is the same for all types of applications of the dynamic modeler 205, and across all industries. That is, for any application in any industry, the home page of the dynamic modeler 205 can use the contextual dynamic data for the application to configure the dynamic options of the home page. Example applications in example industries are discussed below.

The Central Task Hub can include a list of tasks assigned to the user, e.g., one or more of main tasks (M-Tasks), communicator tasks (C-Tasks), activation tasks (A-Tasks), link-up tasks (L-Tasks), contract drafting tasks (CD-Tasks), terms tasks (T-Tasks), or financial technology tasks (FT-Tasks). M-Tasks are assigned as part of the sequenced process of a transaction, to execute a particular task of the transaction. C-Tasks are tasks that are created during the course of a parent M-Task by a resource of the dynamic modeler to which the M-Task is assigned, or by the rule monitor of the dynamic modeler, in order to communicate with another resource associated with the dynamic modeler 205 to obtain information needed to complete the parent M-Task. A resource can be any entity, e.g., a user or an IoT device, that can be assigned a task, e.g., a C-Task for providing information related to an M-Task. That is, every C-Task has a parent M-Task, and after a C-Task is completed by the other resource, the user to which the parent M-Task was assigned can use the information included in the completed C-Task to complete the parent M-Task. The action menus of the Central Task Hub can include controls that allow a user to generate a new M-Task or a new C-Task associated with a particular M-Task.

Each C-Task can have a particular type. For example, a C-Task can be an initiator C-Task, a chat C-Task, a notification C-Task, a decision C-Task, or a collection C-Task.

An initiator C-Task can trigger the creation of an M-Task. The creation of an initiator C-Task can cause the dynamic modeler 205 to send data characterizing the new M-Task to a recipient resource of the dynamic modeler 205, as specified by the initiator C-Task.

A chat C-Task can enable two resources of the platform to communicate directly in real-time. For example, if a user is unsure how to proceed with a particular M-Task that is assigned to the user, then the user can generate a chat C-Task for a supervisor of the user. The dynamic modeler 205 can then present the chat C-Task to the supervisor in real-time, e.g., by opening a chat window between the user and the supervisor. The user and the supervisor can then communicate about the particular M-Task. In some implementations, each chat C-Task must be associated with a specific M-Task; that is, a user cannot send messages to other users of the dynamic modeler 205 that are unrelated to a specific M-Task.

A notification C-Task can be triggered by an M-Task to provide a notification to a resource of the dynamic modeler 205. A notification C-Task for providing a notification to a recipient resource can either be automatically generated by a rule monitor 260 of the dynamic modeler 205, or by an initiating resource of the dynamic modeler 205. The rule monitor 260 is discussed in more detail below.

For example, from a page of the dynamic smart interface 240 corresponding to a particular M-Task assigned to an initiating user of the dynamic modeler 205, the initiating user might decide to share data associated with the particular M-Task with a recipient user of the dynamic modeler 205. As a particular example, the recipient user might be a supervisor of the initiating user, and the initiating user wishes to share a current status of the transaction associated with the M-Task; e.g., the M-Task might be to approve a quote for a particular service provided by a vendor associated with the transaction, and the initiating user wishes to share the quote with the supervisor. From a page of the dynamic smart interface 240 that is associated with the M-Task and that includes the data that the initiating user wishes to share, the initiating user can select an option to generate a notification C-Task. In response, the dynamic smart interface 240 presents a page that allows the initiating user to identify the particular recipient resource for the notification C-Task. In some implementations, the initiating user can also select a portion of the data of the M-Task to provide to the recipient resource in the notification C-Task; in some other implementations, all of the data of the M-Task, e.g., every field of the M-Task, is provided to the recipient resource.

When the initiating user submits the notification C-Task, the dynamic modeler can present the notification C-Task to the recipient user, e.g., using a central task hub 242 of the dynamic modeler 205. The central task hub 242 is discussed in more detail below. The recipient user can review the data associated with the notification C-Task. In some implementations, the recipient user can generate a chat C-Task in response to the notification C-Task, e.g., if the recipient user wants clarification about the data of the notification C-Task.

In the preceding example, the initiating resource and the recipient resource are both human users of the dynamic modelling system 200, but generally the initiating resource and the recipient resource of a notification C-Task can be any resource of the dynamic modelling system 200, e.g., an IoT device. As a particular example, a vehicle which is fitted with an IoT device can trigger a notification C-Task notifying the driver of the vehicle of low tire pressure.

A decision C-Task can be triggered by an M-Task to present a decision to a resource, e.g., to accept or deny a request or to negotiate a particular field of the M-Task with another resource of the dynamic modeler 205. That is, an initiating resource assigned to a particular M-Task can generate a decision C-Task to send to a recipient resource for the recipient resource to make a decision about one or more particular fields of the particular M-Task.

For example, from a page of the dynamic smart interface 240 corresponding to a particular M-Task assigned to an initiating user of the dynamic modeler 205, the initiating user can select an option to generate a decision C-Task. As a particular example, the M-Task might be to approve a quote for a service provided by a vendor resource of the dynamic modeler 205. The initiating user might not wish to approve the quote because the price is too high, and so decides to generate a decision C-Task for the vendor resource with a counter-offer. The dynamic smart interface 240 presents a page that lists each of the fields of the M-Task. The initiating resource can select one or more fields and submit a proposed response for the selected fields. For example, the initiating user can select a field corresponding to the price of the service, and submit a new price that is lower than the price that was proposed by the vendor resource. The initiating resource can also provide an identification for the recipient resource of the decision C-Task, i.e., the vendor resource.

When the initiating resource submits the decision C-Task, the dynamic modeler can present the decision C-Task to the vendor resource, e.g., using the central task hub 242. The vendor resource can then review the proposed responses provided by the initiating resource. In some implementations, the vendor resource is presented all fields of the corresponding M-Task, including those fields that were not selected by the initiating resource and about which the vendor resource does not need to make a decision. In some other implementations, the vendor resource is only presented the fields with proposed responses about which the vendor resource must make a decision.

For each proposed response corresponding to a different field of the M-Task, the vendor resource can either accept the proposed response, reject the proposed response, or revise the proposed response. In some implementations, if the vendor resource accepts a particular proposed response, then the proposed response can be automatically submitted to the M-Task of the initiating user. In some implementations, if the vendor resource rejects a particular proposed response, then the corresponding M-Task or the corresponding transaction can be cancelled, paused, escalated, or replaced. In some implementations, if the vendor resource revises a particular proposed response, e.g., submits a price that is higher than the price proposed by the initiating resource but lower than the original price proposed by the vendor resource, then a decision C-Task can be generated for the initiating resource to, in turn, either accept, reject, or revise the revised proposed response.

In some implementations, the initiating resource can receive a notification C-Task, automatically generated by the dynamic modeler 205, alerting the initiating resource that the decision C-Task has been completed, and presenting data characterizing whether each proposed response was accepted, rejected, or revised.

In the preceding example, the initiating resource is a human user of the dynamic modelling system 200, but generally the initiating resource of a collection C-Task can be any resource of the dynamic modelling system 200, e.g., an IoT device.

In some implementations, one or more videos may be embedded in a decision C-Task; that is, the contextual data of the decision C-Task may include one or more videos. For example, a user may need to attach a video showing the stock inside a warehouse to a decision C-Task in order to verify the stock. The user to which the decision C-Task is assigned can then view the video within the decision C-Task.

In some implementations, live video chat functionality can be embedded in a decision C-Task to facilitate the interaction of multiple users associated with the transaction of the decision C-Task in order to complete the decision C-Task. For example, a user may be assigned a decision C-Task to set particular terms of an agreement. The user can begin a live video chat with one or more other users associated with the transaction of the decision C-Task in order to discuss or negotiate the terms. Once the users have reached an agreement, the live video chat can end and the user to whom the decision C-Task has been assigned can complete the decision C-Task. In some implementations, voice-to-text functionality can also be available within a decision C-Task interface, so that the users can set the verbal agreement into writing.

As another illustrative example, a decision C-Task may be assigned to users who are members of a board that must meet to ratify a document. That is, the decision C-Task may be for the board members to meet, with another decision C-Task assigned to the board members to vote on the ratification. In this example, a user can begin a live video chat with the rest of the board members to discuss the document and to vote, thereby completing the two decision C-Tasks. In some implementations, the votes can be verified using unique identification data of the board members, e.g., biometric data.

A collection C-Task can be triggered by an M-Task to collect one or more fields of the M-Task from a resource of the dynamic modeler. That is, an initiating resource can generate a collection C-Task to send to a recipient resource for the recipient resource to provide a response for one or more fields of an M-Task that is assigned to the initiating user. In some implementations, a collection C-Task can also be generated automatically by the rule monitor 260.

For example, from a page of the dynamic smart interface 240 corresponding to a particular M-Task assigned to an initiating user of the dynamic modeler 205, the initiating user can select an option to generate a collection C-Task. In response, the dynamic smart interface 240 presents a page that lists each of the fields of the particular M-Task for which the initiating user must provide responses. The initiating user can select one or more of the fields, and provide an identification for a recipient user to whom the collection C-Task should be assigned. The dynamic modeler 205 can then present the collection C-Task to the recipient user, e.g., using the central task hub 242. The collection C-Task presented to the recipient user includes only those fields that were selected by the initiating user; that is, the collection C-Task presented to the recipient user does not include any other fields of the parent M-Task that the initiating user did not select. In some implementations, the recipient user is also presented with some or all of the contextual data associated with the parent M-Task to provide context for the presented fields. The recipient user can provide responses for the presented fields, and submit the collection C-Task. The dynamic modeler 205 can then present, e.g., using the dynamic smart interface, the completed C-Task to the initiating user to verify the responses of the recipient user.

In some cases, the initiating user might decide to change one or more of the responses provided by the recipient user. For example, the initiating user might notice an error, or disagree with a decision made by the recipient user. In these cases, the initiating user can select the fields that are to be changed, and provide an updated response for each selected field. In some implementations, the dynamic smart interface 240 can provide indications to the initiating user of tracked changes to the fields. This allows the initiating user to easily track what changes have been made, and can provide an audit trail of what changes were made and by whom for later reference. For example, the dynamic smart interface 240 can include, next to each field in the collection C-Task, i) a timestamp corresponding to the time at which the field was most recently updated and ii) an identification of the resource of the dynamic modeler 205 that most recently updated the field. As another example, the dynamic smart interface 240 can provide an option for the initiating user to see a side-by-side comparison of the responses submitted by the recipient user and the updated responses submitted by the initiating user.

After the initiating user submits the updated responses to the fields of the collection C-Task, the rule monitor 260 can determine that there is a discrepancy between the data submitted by initiating user and the data submitted to the initiating user by the recipient user; that is, the rule monitor 260 can detect that the initiating user updated the data after the recipient user submitted the collection C-Task. In some cases, the rule monitor 260 can automatically send a notification to the recipient user that the data has been changed by the initiating user. In some other cases, the rule monitor 260 can prompt the initiating user, e.g., by sending a notification to the initiating user, to suggest that the initiating user notify the recipient user that the data has been changed. In some cases, the initiating user can notify the recipient user by sending a notification C-Task to the recipient user.

The recipient user can receive the notification, either from the initiating user or from the rule monitor, and view the changes to submissions of the fields of collection C-Task. For example, the notification can include a side-by-side comparison of the responses submitted by the recipient user and the updated responses submitted by the initiating user. In some cases, the recipient user can either approve or reject the changes made by the initiating user. In some cases, the recipient user can chat with the initiating user about the changes, e.g., by generating a chat C-Task. If the changes are rejected by the recipient user, then the dynamic modeler 205 can determine appropriate next steps, e.g., escalating the matter by generating a decision C-Task for a supervisor of the recipient resource or the initiating resource.

In the preceding example, the initiating resource and the recipient resource are both human users of the dynamic modelling system 200, but generally the initiating resource and the recipient resource of a collection C-Task can be any resource of the dynamic modelling system 200, e.g., an IoT device.

As discussed above, the initiating resource for a particular task can be the rule monitor 260 of the dynamic modeler 205. That is, the rule monitor 260 can automatically trigger the generation of a task in response to the completion of a different task by another resource of the dynamic modeler 205, e.g., after detecting a discrepancy in the contextual data of the different task.

For example, the rule monitor 260 can generate a "child" M-Task using the contextual data of a "parent" M-Task in whose contextual dynamic data the rule monitor 260 detected a discrepancy. The rule monitor 260 can then provide, using the child M-Task, one or more candidate smart claims associated with the parent M-Task based on the set smart terms of the parent M-Task. This process is described in more detail below, e.g., with respect to FIG. 7 and FIG. 8. The rule monitor 260 can automatically determine the appropriate recipient resource of the child M-Task, and the dynamic modeler 205 can send data characterizing the generated child M-Task to the determined recipient resource. Upon receiving a response back from the recipient resource that includes data characterizing the completed child M-Task, the rule monitor 260 can process the response to automatically validate the contextual data of the completed child M-Task. If the rule monitor detects a discrepancy in the data of the completed child M-Task, the rule monitor can generate another child M-Task to reconcile the discrepancy.

Each task in the Central Task Hub 242 can be represented by an interactable graphical element with which a user can interact to open a task page for the particular task. The Central Task Hub can also include other interactable graphical elements that are not related to particular tasks to which the user has been assigned. The listed tasks can be specific according to the role and credentials of the user, and can be stored in a table or database in, or accessible by, the dynamic modeler 205.

Thus, rendering the home page can include submitting a query to the database, receiving the list of tasks and/or other interactable graphical elements corresponding to the user from the database in response to the query, and rendering information about each of the received tasks and/or interactable graphical elements on the home page. For example, the rendering of a task can include a transaction name, a task name, a due date, etc. The elements on the home page can be ordered, e.g., by priority or age.

From the home page, the user may select one of the listed elements to open. For example, the user can select an element with a single dynamic first event; that is, the user opens the element with a single interaction with the user device, e.g., with a single mouse click. The single dynamic first event can cause the dynamic modeler 205 to generate a particular output according to the single interaction with the user device. To do so, the user device 210 can then send a dynamic single request input 212 with contextual dynamic data to a dynamic modeler 205. The dynamic single request input 212 can define the dynamic user interface interaction that prompted the event, e.g., by specifying the particular task that the user selected.

For example, if the selected graphical element characterizes a task assigned to the user, the contextual dynamic data can identify the user, the particular task that the user selected, and a transaction that the task is a part of. As a particular example, the contextual dynamic data can include a user profile, a transaction profile, a task profile, and an output model profile. The user profile can include data fields that characterize the user. As a particular example, each user profile can inherit from a base user class, with fields such as "name," "role," "credentials," etc. The transaction profile can include data fields that characterize the transaction, e.g., a transaction type and a list of associated resources. The task profile can include data fields that characterize the task, e.g., an assigned user, the corresponding transaction, etc. The output model profile can include data characterizing the particular configuration of the dynamic modeler 205, e.g., as established by the organization of the user.

A user profile can also more broadly be called a resource profile, as users of the dynamic modeler 205 are an example of a resource that interacts with the dynamic modeler 205. The resource profile associated with a user can include unique identification data identifying the user. The identification data can be collected during an on-boarding process of the user into the dynamic modeling system 200. The identification data can depend upon the role of the user within the organization that is using the system 200; the role of the user can also be identified in the resource profile of the user. The identification data can also depend upon the data and applications that the user is permitted to access. The identification data can also depend upon the tasks that have been assigned to the user. The dynamic modeling system 200, during the on-boarding process, can process the contextual data of the resource profile to determine what types of identification data must be obtained from the user. For example, a user's role might require that biometric data, e.g., fingerprint data or facial recognition data, be obtained from the user. The biometric data can be obtained from the user during an A-Task of activating the user on the dynamic modeling system 200.

In addition to verifying the identity of a user when the user logs into the dynamic modeler 205, the dynamic modeling system 200 can require authentication when a user opens a task or transaction. The dynamic modeling system 200 can determine, for a particular task or transaction, a type of identification data that is required to be obtained from the user for the user to complete the task or to view or modify the transaction. The dynamic modeling system 200 can use the contextual dynamic data of the task or transaction to make this determination. For example, the dynamic modeling system 200 can determine that a task directed towards completing a payment always requires a biometric input from the user, while viewing other documents of the dynamic modeling system 200 only requires a password. In some implementations, the dynamic modeling system can authenticate the user using a run-time task interface; run-time task interfaces are discussed in more detail below.

As a particular example, an M-Task of the dynamic modeling system 200 might be for an organization's board to have a board meeting. The dynamic modeling system 200 can require a biometric input for each board member to join the board meeting and complete this M-Task. Then, after the board meeting has been completed, the dynamic modeling system 200 can use the biometric inputs to confirm attendance at the board meeting, e.g., by using the biometric inputs to determine who did and did not attend the board meeting.

In some cases, the user's role within the organization may change over time, e.g., if the user is promoted or changes positions within the organization. For example, the user may gain access to new data or new applications, or may be assigned new types of tasks. When this happens, the identification requirements of the user may change; for example, the credentials data structure 230 may need to perform a stricter authentication process. When this occurs, the rule monitor 260 can create a new C-Task for the user to submit the new identification data required.

In some implementations, a resource profile, e.g., a user profile, can be transferred between different resources of the organization. For example, if a resource leaves an organization (e.g., if a user retires or if an IoT device is replaced), then the resource profile of the departed resource can be transferred to the resource that replaces the departed resource. Therefore, the dynamic modeler can maintain the full history of each resource, task, and transaction, without losing any data due to resource turnover. For example, a user's profile can include information that is important for filling the role of the user. Transferring resource profiles maintains traceability of the data of the dynamic modeler across time.

As a particular example, a user may be required to approve a payment. That is, the user can be assigned a decision C-Task (in this case, an "approval" C-Task) for the user to decide whether or not to approve a new payment. Embedded within the approval C-Task, i.e., in the contextual dynamic data of the approval C-Task, can be an automatic prompt to re-validate the unique identification data of the user. Validation of the unique identification data of the user can include automatic facial recognition by the user device 210 or a one-time password sent to the user device 210.

The dynamic modeler 205 can receive the dynamic single request input 212 and use it in combination with additional contextual information to generate an output model 222 that characterizes the next page that is to be presented to the user on the user device 210. The dynamic modeler 205 can using intelligent resource interaction to generate the output model 222. That is, the dynamic modeler 205 can use historical data to learn how to generate the output model 222, e.g., using one or more machine learning models. For example, if the output model 222 corresponds to a task assigned to the user of the user device 210 for selecting resources to use during a transaction, then the dynamic modeler 205 can use IRI along with the contextual information of the dynamic single request input 212 and historical data to identify resources to present as suggestions.

The dynamic modeler 205 can include a dynamic smart interface 240 that includes the Central Task Hub 242, a dynamic report viewer 244, and a C-Task generator 246.

As previously stated, one or more of the interactable graphical elements listed on the Central Task hub 242 can correspond to non-actionable items that the user can view. For example, a non-actionable interactable graphical element can identify a document that can be viewed by the user. As a particular example, a user that has completed a previous task in a given transaction may wish to see a report of the progress of the given transaction, or the output of a particular step in the given transaction. In this case, the list of interactable graphical elements presented to the user on the home page can include one or more elements that correspond to documents that the user may wish to review. When the user selects one such element, the dynamic report viewer 244 can generate the report for display to the user, including the generated report in the output model 222. The generated reports can be standardized; that is, each report generated by the dynamic modeler 205 can be generated according to a template and populated according to the contextual dynamic data of the dynamic single request input 212.

As another example, a user that is a part of a transaction may wish to generate "document outputs," i.e., documents that the user can export from the platform. That is, the user can select a document that is presented on the home page as a non-actionable graphical element, and when the document is rendered for the user, select a method of exporting the document from the platform; e.g., the user may wish to export an invoice for mailing to a client.

As another example, a non-actionable interactable graphical element can characterize an operation for performing data reconciliation. For example, the user can request certain data related to a particular task or a particular transaction, and the dynamic modelling system can extract accurate and reliable data from a database that stores data related to tasks and transactions, and model and render a page that presents this data to the user. On the backend, the dynamic modeler 205 can perform automatic data validation and reconciliation to ensure the quality of the data.

These non-actionable elements can be associated with a particular transaction, but they are not a part of the sequenced process of tasks for the particular transaction; e.g., these non-actionable elements can be optional for the user to review. When the user selects such a non-actionable element, the user device 210 can again send a dynamic single request input 212 that defines the particular dynamic user interface interaction that caused the event to be triggered; for example, the dynamic single request input 212 can define the particular report document that the user is requesting the dynamic report viewer 244 to generate. Upon receiving the dynamic single request input 212, the dynamic modeler 205 can dynamically model and render the requested report document, with no controls for the user to interact with.

The C-Task generator 246 can be used by the user of the user device 210 to generate a C-Task for a particular M-Task that is assigned to the user and listed in the Central Task Hub 242. The process for generating a C-Task is discussed in more detail below in reference to FIG. 5.

The dynamic modeler 205 can include a dynamic process manager 250 that manages a rule monitor 260, a smart task generator 270, and a task chain system 280. The dynamic modeler 205 can determine which received dynamic single request inputs 212 require interaction with one or more of the rule monitor 260, the smart task generator 270, or the task chain system 280, and can manage that interaction, e.g., by generating one or more tasks to send respective queries to the required subsystems.

The rule monitor 260, for example, can detect discrepancies in M-Tasks according to rules of the dynamic modeler 205. In some cases, the rule monitor 260 can present one or more rule options to the user on the user device 210. This process is discussed in more detail below in reference to FIG. 5. When a user completes an M-Task, the rule monitor 260 can also determine a next task in the transaction of the completed M-Task and determine a next resources of the dynamic modeler 205 to whom to assign the next task.

In some implementations, the dynamic report viewer 244 can also generate reconciliation reports for the user that presents data characterizing discrepancies detected by the rule monitor 260. For example, when the rule monitor 260 detects discrepancies in the data corresponding to a particular task, the rule monitor 260 can provide data characterizing the discrepancies to the dynamic report viewer 244, which can generate a reconciliation report emphasizing the data discrepancies. As a particular example, the reconciliation report can highlight, e.g., with a particular color, the data of the task that has a discrepancy according to the rule monitor 260.

The smart task generator 270 can generate a model for the task page to include in the output model 222. For example, the smart task generator 270 can determine, according to the output model profile of the dynamic modeler 205 and the contextual dynamic data of the dynamic single request input 212, what data to include in the output model 222. The selected fields will be presented to the user on the task page to complete the M-Task.

The task chain system 280 can manage one or more task chain contracts between different entities or resources of the dynamic modeler 205. A task chain is a sequence of tasks, corresponding to the same transaction, that are completed by respective resources of the dynamic modeler. A task chain contract is a data object that is written to a distributed ledger that includes contextual dynamic data from each task in the task chain of the transaction.

The task chain contract can include a set of terms and conditions that are encoded in the distributed ledger in the context of the task chain and that authenticates and permanently records the task chain contract. In some cases, when the conditions of the task chain contract are met, the terms of the task chain contract are automatically enforced using the distributed ledger. In some cases, payments related to a task chain contract can be made using a cryptocurrency; in some other cases, payments can be made using a traditional currency. The task chain contract system 280 can write the terms of the task chain contract to a secured distributed ledger to ensure that the task chain contract data cannot be modified after storage. For example, a resource of the dynamic modeler 205 can access the terms and conditions of a task chain contract encoded in the task chain contract system 280 to determine if the terms and conditions have been satisfied; the task chain contract system 280 can thereby provide a single source of the ground-truth agreement between multiple different parties so that there is no confusion or ambiguity about the agreement.

When a task chain contract is saved to the distributed ledger, the task chain contract can be concurrently saved in one or more databases accessible by the resources of the dynamic modeler 205. Then, when the task chain contract for a transaction is queried, one or more data fields of the record can be queried from the version of the record that is saved in a particular database, and compared against the ground-truth record that is saved to the distributed ledger.

The dynamic modeler 205 can provide the generated output model 222 to a render structure 240 in the dynamic modeler 205, which can use the output model 222 to generate render data 292 that can be used by the user device 210 to render the modelled page on a graphical user interface of the user device 210, e.g., code defining the layout and content of a user interface that is interpreted by an application on the user device to render the page.

In some implementations, the render structure 240 sends the render data 292 to a virtual machine associated with the user device 210 and that is separate from the user device 210. In these implementations, the virtual machine renders the pages generated by the dynamic modeler 205, and sends image data for presentation on a remote client of the user device 210. This can be helpful when the client of the user device 210 is a thin client and has limited capability of rendering pages. In these implementations, the virtual machine associated with the user device 210 can include the memory 211 of the user device 210, as described above.

In some cases, the current page of the user is a task page for completing a particular M-Task, and the user may select to save and submit the completed M-Task. For example, the user can submit a single dynamic final event to complete the current task and return the user to the Central Task Hub 242 with a single interaction with the user device. That is, the user can complete the task and write the data of the completed task to one or more databases using a single interaction with the user device 210.

In some implementations, after a user submits a dynamic final event to complete an M-Task or a C-Task (i.e., after the user device 210 submits a dynamic single request input 212 that characterizes a dynamic final event), the dynamic modeler 205 generates render data 292 that characterizes a prompt box, or "smart assistant," and displays the prompt box to the user on the user device 210.

The smart assistant is sometimes called a "runtime task interface," because it provides an interface for the resources after completing a task and can prompt the resources to complete one or more other tasks associated with the completed task.

The runtime task interface includes one or more dynamic options that are available to the user in response to the completion of the task. The one or more dynamic options can be determined, according to the contextual dynamic data provided in the dynamic single request input 212, by the rule monitor 260. The contextual dynamic data can include the transaction context and task profile, which the rule monitor 260 can process to generate the one or more dynamic options. Smart assistants are discussed in more detail below, e.g., with respect to FIG. 7 and FIG. 8.

In other words, the dynamic final event includes the data that is relevant to the completion of the M-Task or C-Task, and the dynamic modeler 205 can therefore prompt the user with the information required to continue with the transaction associated with the completed task, or to comply with the requirements of the task profile of the completed task. Again, the user can submit the dynamic single request input 212, prompting the generation of the runtime task interface, with a single interaction with the user device 210, e.g., a single click.

The one or more dynamic options presented to the user in the runtime task interface following the completion of an M-Task or a C-Task can include one or more unresolved C-Tasks associated with the completed M-Task or completed C-Task (e.g., one or more unresolved C-Tasks that are associated with the M-Task of the completed C-Task). For example, the dynamic options can include one or more M-Tasks or C-Tasks assigned to the user that are related to the same transaction as the completed M-Task or C-Task. The smart assistant can determine, using the contextual dynamic data of the transaction and/or the completed M-Task or C-Task, the dependency between the tasks of the transaction, and therefore can determine a subsequent task that needs to be completed following the completion of the completed M-Task or C-Task. As another example, the dynamic options can include a prompt for the user to generate a new chat C-Task to another resource that is associated with the transaction of the completed M-Task or C-Task.

The one or more dynamic options can identify one or more M-Tasks that are assigned to the resource and that have approaching deadlines. For example, the runtime task interface can include an M-Task if the deadline of the M-Task is within a threshold amount of time.

The one or more dynamic options can include generating output documents related to the completed task; for example, the task profile of the completed task might require one or more report documents to be generated at the completion of the task. The one or more dynamic options can include an option to send a notification (e.g., a notification C-Task) to one or more other users associated with the completed task, alerting them to the completion of the task.

For example, the runtime task interface can include data identifying one or more instructions to the user that are contextually relevant to the completed task, e.g., instructions to initiate a C-Task related to a completed M-Task. As another example, the runtime task interface can include data identifying, to the user, transactional terms and conditions that are relevant to the data provided by the user in the dynamic single request input 212, e.g., data associated with the completed task obtained from the task chain system 280 and/or data generated during a previous T-Task. T-Tasks are discussed in more detail below, e.g., with reference to FIG. 7 and FIG. 8. As another example, the runtime task interface can include data identifying one or more incomplete or unread tasks related to the completed task and which contain relevant data that the user may need to address before completing the task. As another example, the runtime task interface can include data prompting the user to share data associated with the completed task with another user, e.g., managers or counterparties of the task, who may need to approve or comment upon the task before it is completed. As another example, the runtime task interface can include data allowing the user to attach one or more documents to the transaction or task before the task is completed. As another example, the runtime task interface can allow the user to print one or more documents associated with the completed task.

After the user interacts with the runtime task interface, the user device 210 can send another dynamic single request input 212 to the dynamic modeler 205 that includes contextual dynamic data characterizing the user's interaction with the runtime task interface, and the dynamic modeler 205 can react accordingly.

In some implementations, after a user submits a dynamic final event to complete a task, the Dynamic Smart Interface 240 can use contextual dynamic data, e.g., contextual dynamic data included in the single dynamic final event, to determine an updated list of tasks assigned to the user and non-actionable elements available to the user based on the previous user action, and generate an output model 222 of the Central Task Hub 242 to present to the user on the user device 210. In some other cases, the current page of the user is a task page corresponding to a particular M-Task, and the user may select to open a report that is associated with the particular M-Task. The dynamic report viewer 244 can then generate the report according to the user, task, transaction, and output model profiles.

In some implementations, after the user opens a particular task from the Central Task Hub 242 and the dynamic modelling system 200 renders the selected task page on the user device 210, the user may determine that the task needs further attention, e.g., that the task need to be escalated. That is, the user determines that another user, e.g., a supervisor, should review the task or respond to particular commands in the task before the transaction continues to the next task in the sequenced process. For example, a response to a previous task in the transaction might include information that requires supervisor approval or verification. As a particular example, a first task in the transaction can be for a contractor to provide a quote to a company, and a second task in the transaction can be for an employee of the company to approve the quote. The employee may have a maximum amount that he or she is permitted to accept without supervisor approval. If the provided quote surpasses this maximum amount, then the employee can escalate the task so that that task is assigned to the supervisor for approval. In these cases, the user can generate a new C-Task using the C-Task generator 246 indicating that the task is to be escalated and selecting one or more particular fields of the M-Task that should be reviewed. In this case, the dynamic single request input 212 can include contextual dynamic data characterizing the generated C-Task, the user, and the transaction. In response to this input, the dynamic modeler 205 can use the contextual dynamic data to determine a next resource to assign the new C-Task, e.g., a supervisory user, and assign the new C-Task to the next resource.

In some other cases, after the user opens a particular task from the home page and the dynamic modelling system 200 renders the selected task page on the user device 210, the user may wish to "snooze" the particular task. That is, the user does not want to complete the task, but rather remove the task from the list of tasks assigned to the user for a specified amount of time, e.g., a day, a week, or a month. In these cases, the user can submit an input to the dynamic modeler 205 indicating that the task is to be snoozed; the input can include contextual dynamic data characterizing the task, the user, and the transaction. In response to this input, the dynamic process manager 250 can use the contextual dynamic data to remove the task from the list of tasks assigned to the user, and then add the task back to the list after the specified amount of time has passed.

Figure 3:
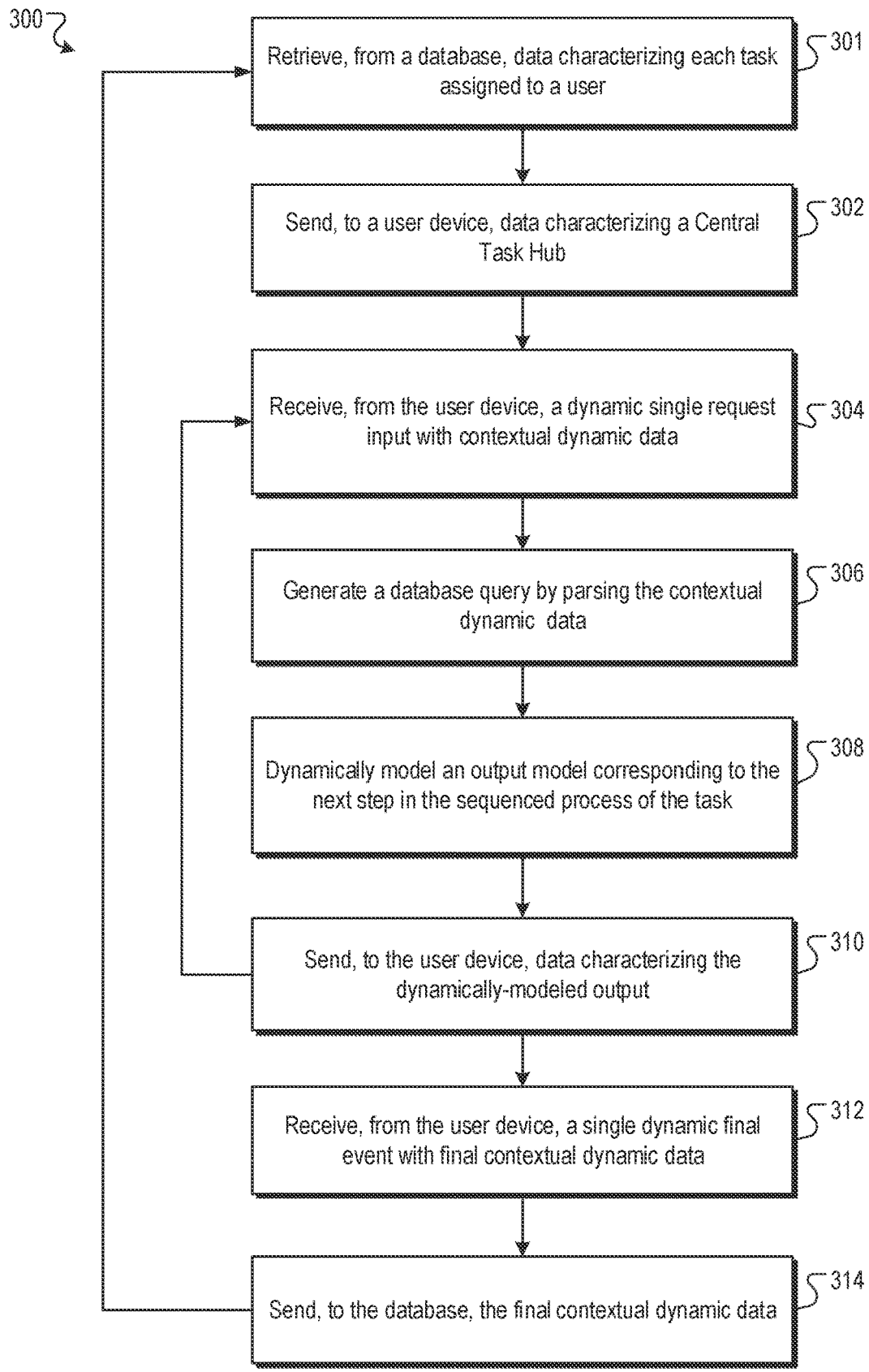
FIG. 3 is a flow diagram of an example process for responding to a dynamic event.

FIG. 3 is a flow diagram of an example process 300 for responding to a dynamic event. For convenience, the process 300 will be described as being performed by a system of one or more computers located in one or more locations. For example, a dynamic modeler, e.g., the dynamic modeler 130 depicted in FIG. 1 or the dynamic modeler 205 depicted in FIG. 2, appropriately programmed in accordance with this specification, can perform the process 300.

The system retrieves, from one or more databases, data characterizing each task that is assigned to a particular user (step 301). The retrieved tasks can include a task from each transaction in which the user is a participant and for which the user is assigned.

The system sends, to a user device, data characterizing a Central Task Hub (step 302). The Central Task Hub presents to the user the list of tasks assigned to the user. The Central Task Hub allows the user to select, with a single screen interaction, a task that the user wishes to complete. The Central Task Hub can be generated by a dynamic smart interface of the dynamic modeler, and the generation may be in response to a user authentication event; e.g., the user may have provided login credentials that the system validated in a previous time step.

The system receives, from the user device, a dynamic single request input with associated contextual dynamic data (step 304). The dynamic single request input is received in response to the user interacting with the Central Task Hub. The dynamic single request input can be one of multiple different dynamic interaction types, and can be received from one of multiple different modes, e.g., via a voice command, an API command, or a screen interaction such as a tap or a click. For example, the dynamic single request input can be a single dynamic first event, where the user selects a particular task of a transaction from the Central Task Hub. Here, the contextual dynamic data includes i) a profile of the user, ii) a profile of the selected transaction, iii) a profile of the selected task, and iv) an output model profile of the dynamic modeler.

The system generates a database query by parsing the contextual dynamic data of the received dynamic single request input (306). The database query is generated to retrieve, from one or more databases, a next step in a pre-defined sequenced process associated with the selected task. The next step of the task can include one or more controls that are to be presented to the user, e.g., prompts for the user to input information. In some cases, the first step of the task will also include a set of available options for the user to respond to each of the particular prompts. The available prompts to be provided are dependent upon the context and, in particular, to the resource and task.

The system dynamically models an output model corresponding to the retrieved next step of the sequenced process of the task according to the results of the query (step 308). The output model includes all controls for the next step in the sequenced process of the task. The system can generate the output model dynamically by automatically interpreting the content of the dynamic single request input, including the contextual dynamic data. This process is described in more detail below in reference to FIG. 4.

The system sends, to the user device, data characterizing the dynamically-modeled output. (step 310). The data is used by the user device to render the page of the output model on a display of the user device.

In some implementations, the system can repeat steps 304-310 for each step in the sequenced process of the selected task. That is, for each subsequent step in the task, the system can receive, from the user device, a dynamic single request input with contextual dynamic data (step 304). Here, the contextual dynamic data includes the user's responses to the prompts presented in the previous step in the sequenced process of the task. The system can generate a database query according to the received contextual dynamic data (step 306). Again, the query is generated to retrieve the subsequent step in the sequenced process. In some cases, the subsequent step will vary according to the user's responses to prompts in previous steps of the sequenced process of the task. For example, the set of available options for a particular prompt can be limited according to previous responses. The system can then model the graphical page of the retrieved subsequent step, and send data characterizing the dynamically-modeled page to the user device (steps 308 and 310).

In some other implementations, the generated dynamic model includes respective information for each of the steps in the sequenced process of the task. In these implementations, after receiving data characterizing the generated dynamic model (step 310), the user device can use the generated dynamic model to collect the user's responses to the prompts of each step of the task, use the responses of each step to render a new page that corresponds to the subsequent step in the sequenced process of the task, and present the new page to the user. In other words, the user device does not send a new dynamic single request input to the system and wait for data in response for every step of the sequenced process. This process is described in more detail below in reference to FIG. 4.

In some implementations, the data characterizing the dynamically-modelled page can include one or more listeners attached to a field of the dynamically-modelled page. These listeners can be triggered when a user interacts with the field, e.g., selecting an option or inputting text. The triggers can automatically send data entered into the field to the database, without the user actively saving the progress on the dynamically-modeled page. As a particular example, the field may be a selection of a particular airline seat for an upcoming flight; the listener can automatically receive the data that the user submits to this field and send it to the database, so that the database can reflect the fact that the seat has been reserved and cannot be reserved by another user. Thus, a second user cannot reserve the seat after the user has selected the seat but before the user has completed the task or saved the progress of the task.

The system receives, from the user device, a single dynamic final event with final contextual dynamic data (step 312). In some cases, the single dynamic final event is a single-save event, where the user selects to save the progress of the current task with a single interaction. In these cases, the single-save event can be received in response to the user selecting, with a single screen interaction, to save the results of the sequenced process, e.g., by selecting a "Save" button. In some other cases, the single dynamic final event is a cancel event, where the user cancels the progress made on the task so far and returns the task to the list of tasks assigned to the user without any updates to the task, e.g., by selecting an "Exit" button.

When the single dynamic final event is a single-save event, the final contextual dynamic data can include the user's responses to the prompts presented in the most recent step of the sequenced process. In some cases, the user completed the selected task before sending the single-save event. That is, the most recent step of the sequenced process of the task was the final step in the sequenced process of the task, and the user responded to every prompt in the final step. In some other cases, the user did not complete the selected task before sending the single-save event. That is, the most recent step of the sequenced process of the task was not the final step in the sequenced process of the task, or the user did not respond to every prompt in the most recent step.

The system sends, to the database, the final contextual dynamic data (step 314).

In the cases where the final event was a cancel event, the contextual dynamic data can include the progress of the particular task before the user started on the task, in step 304.

In the cases where the final event was a single-save event and the user completed the selected task, the database can use the final contextual dynamic data to determine i) the next task in the transaction, and ii) the next resource to which the next task should be assigned. In some cases, the final contextual dynamic data will specifically identify the next resource; that is, the user will have selected the next resource to assign the next task in the transaction. In some other cases, the next resource can be determined according to the transaction profile, the task profile, and/or the output model profile of the dynamic modeler.

In the cases where the single dynamic final event was a single-save event and the user did not complete the selected task, the database can determine that the selected task should still be assigned to the user, and can save the user's progress through the selected task.

In some implementations, a background process can run on the data stored in the database that processes data that has been added to the database. For example, if the system sends contextual dynamic data of a task to the database that includes data that characterizes a particular transaction, then the background process can process that data and produce an output that is added to the transaction profile of the particular transaction. As a particular example, a user can complete a task that is an approval for the transaction to continue, so the contextual dynamic data that the system sends to the database after the supervising user completed the task includes data characterizing whether the transaction is approved or denied. The background process can process this contextual dynamic data, e.g., to determine the decision, and modify the transaction profile of the particular transaction, e.g., by writing a field to the transaction profile that characterizes the status of the transaction. In some such implementations, the background process can be triggered when new data is sent to the database. In other such implementations, the background process can be triggered when a query for the processed data is submitted to the database; for example, the background process can wait to process the contextual dynamic data characterizing the status of the transaction until the database receives a query for a report on the status of the transaction.

The system can further repeat the entire process 300, starting from step 301. That is, the system can automatically return the user to return to the Central Task Hub that presents a list of tasks assigned to the user following a single save event to a dynamically rendered page. This list can be updated to account for both the completion of a task and the addition of any newly assigned tasks.

Figure 4:
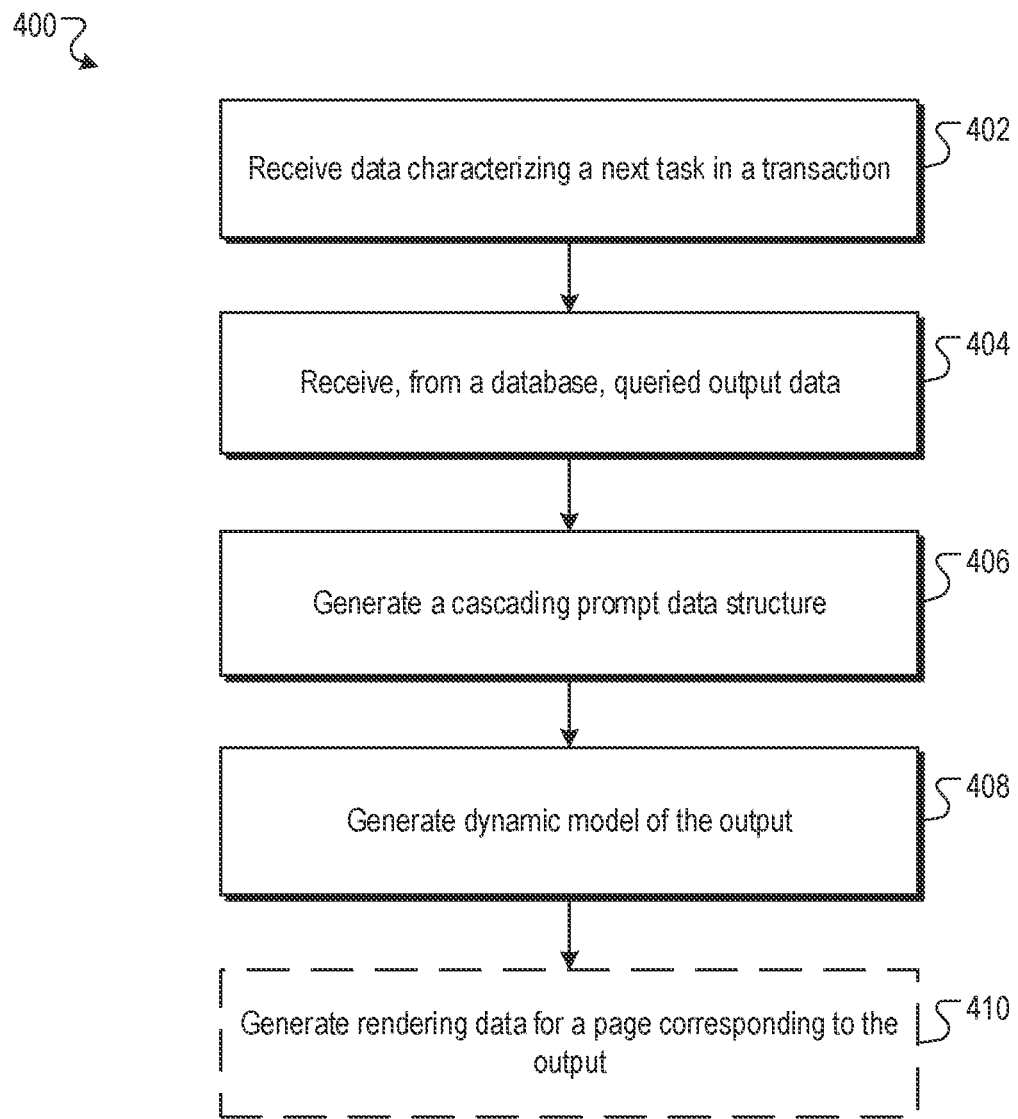
FIG. 4 is a flow diagram of an example process for dynamically modeling an output.

FIG. 4 is a flow diagram of an example process 400 for dynamically modeling an output. The output is to be presented to a resource to complete a task in a given sequenced process that defines a transaction. For convenience, the process 400 will be described as being performed by a system of one or more computers located in one or more locations. For example, a dynamic modeler, e.g., the dynamic modeler 130 depicted in FIG. 1 or the dynamic modeler 205 depicted in FIG. 2, appropriately programmed in accordance with this specification, can perform the process 400.

The system receives data characterizing a next step in the transaction (step 402). The transaction includes a sequence of tasks, where each task has a precise configuration given the outputs of the previous tasks in the sequence. In some cases, the sequence of tasks itself can be dynamic based on the outputs of the previous tasks in the sequence; that is, a next task after a particular task in the sequence can depend on the output of the particular task, so that for some outputs a first resource is assigned a first task as the next task and for some other outputs a second resource is assigned a second task as the next task. In some other cases, the sequence of tasks can be predetermined according to a type of the transaction; e.g., some transactions can always have the same tasks executed in the same order. The received data can include a set of possible controls to present to a resource that is a user of the dynamic modeler on a page corresponding to the task to complete the task.

The system receives, from a database, queried output data (step 404). The output data can include a set of possible responses to each of the prompts for the given task. The output data can also include responses to previous tasks in the sequenced process.

The system generates a cascading prompt data structure from the queried output data (step 406). The cascading prompt data structure can define, for each particular sequence of responses provided by the resource to a sequence of prompts, a set of subsequent prompts and options to be provided for the resource to respond to the subsequent prompts. That is, if the resource responds to a first prompt in a particular way, then the subsequent prompts and options presented to the resource can be different than if the resource had responded to the first prompt in a different way. In this specification, the cascading prompt data structure is also referred to as "dynamic cascading filters," because each response to a particular prompt earlier in the sequence can dynamically filter out possible prompts and options later in the sequence.

As a particular example, the system can dynamically generate a tree of prompt options using the queried output data. Each level of the tree can correspond to a given prompt, and each node at the level can define every option that should be presented for the given prompt given a particular set of responses to previous prompts. Every option defined by a particular node can have a corresponding edge connecting the node with a child node at the level directly below the current level in the tree. If the resource selects a particular option, then the system should traverse the edge corresponding to the option down to the corresponding child node, and use the child node to determine the options to present for the next prompt. Thus, the system can traverse the tree to iteratively determine options based on previous selections. Each of the prompts and available options can also depend upon the resource and the particular task.

The system generates the dynamic model of the output (step 408). In particular, the system uses the cascading prompt data structure to determine the model that will be used to provide the dynamic options available to the resource for each prompt. For example, the system can use a dynamic process manager, e.g., the dynamic process manager 250 depicted in FIG. 2, to generate the dynamic model.

Optionally, the system can generate rendering data of a page corresponding to the output using the dynamic model of the output (step 410). The rendering data can include data that will be used by a user device to render the page on a display of the user device. For example, the system can use a render structure, e.g., the render structure 290 depicted in FIG. 2, to generate the rendering data.

In some implementations, the system uses a user-interface template to generate rendering data for a page corresponding to a dynamically-generated output. For example, the page can always include a single button that the user can interact with to save the progress of the given task and return to the home page. The button can always be located in the same place on the rendered screen. As another example, the page can always include a region that identifies the task, e.g., a region at the top of the page that includes a task name, a transaction name, a due date, etc. The region can always have the same format, color, etc.

That is, the content of the output is dynamically determined according to the particular task, transaction, and resource, but the appearance and structure of a page corresponding to the output can be standardized. This can help make the dynamically-generated pages easier to understand for the user, because the user is familiar with the layout across multiple different tasks even if the content changes.

The system can use the cascading prompt data structure to generate logic that the user device can use to navigate the cascading options as the user responds to prompts. For example, the system can generate listeners on the screen that identify what option was selected when a user responds to a prompt. The system can also generate rendering data for each possible prompt to be displayed to the user. Then, the user device can use the data received from a listener to determine the next prompt to be displayed, and then use the generated rendering data to render the next prompt on the display. Thus, the user device can iteratively use the rendering data to guide the user through the completion of the task.

The rendering data can also be generated according to the particular task, transaction, user, and/or output model profile of the dynamic modeler. For example, a task can have a type that partially determines the rendering data. As a particular example, a first task might be to approve the output of a preceding task in the sequenced process of tasks, where the user must input a binary decision of whether the output is approved. A second task might be require the user to type a text response to a prompt. Each of these task types might have particular rendering data that is different from other task types.

Figure 5:
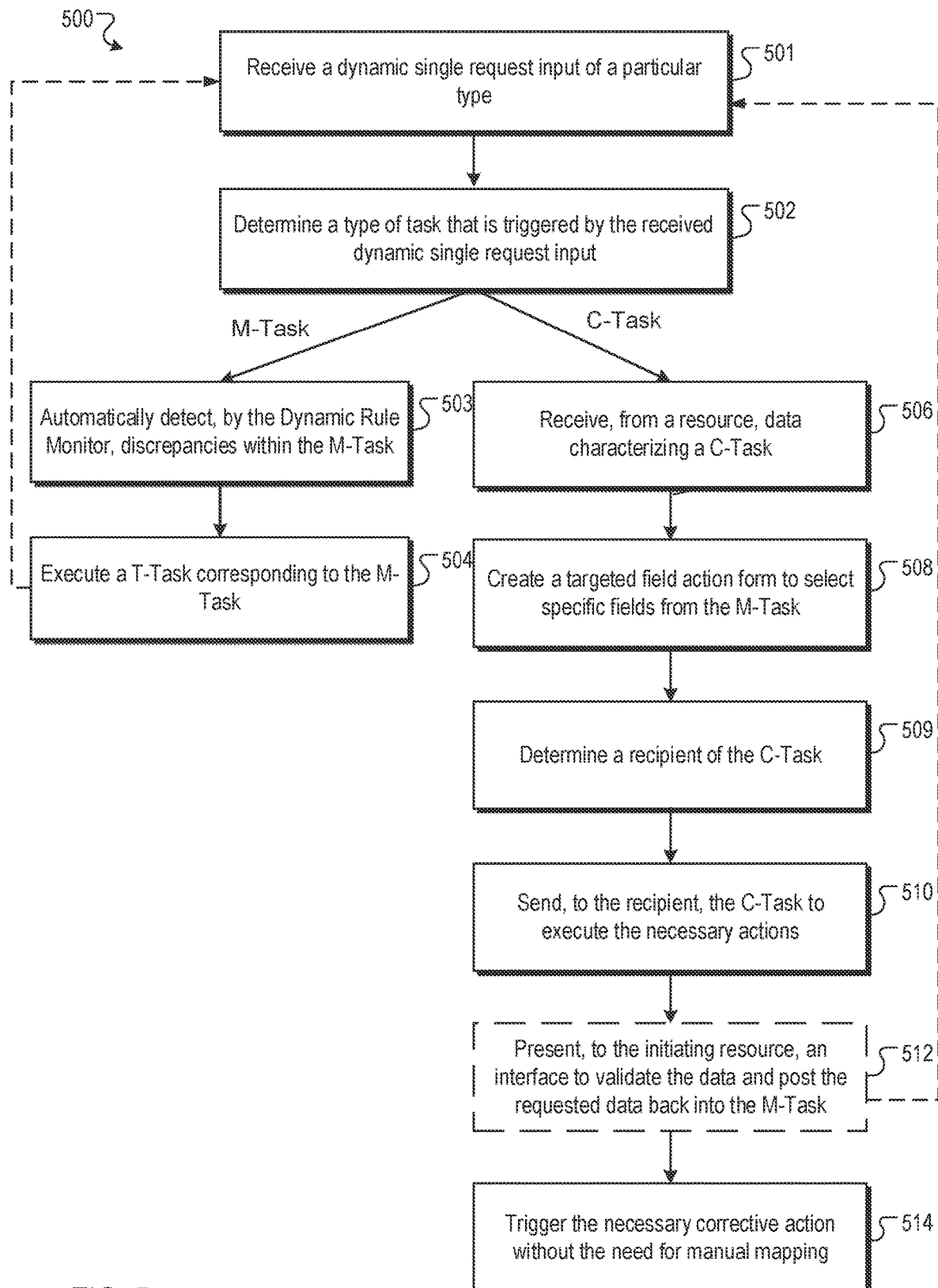
FIG. 5 is a flow diagram of another example process for dynamically modeling an output.

FIG. 5 is a flow diagram of an example process 500 for validating data of the dynamic modeler. For convenience, the process 500 will be described as being performed by a system of one or more computers located in one or more locations. For example, a dynamic modeler, e.g., the dynamic modeler 130 depicted in FIG. 1 or the dynamic modeler 205 depicted in FIG. 2, appropriately programmed in accordance with this specification, can perform the process 500.

The system receives a dynamic single request input having a particular type (step 501). The dynamic single request input can be received from a resource associated with the dynamic modeler, e.g., a user of the dynamic modeler or an IoT or non-IoT device.

In response to the received dynamic single request input, the system determines what type of task is triggered by the received dynamic single request input (step 502). In particular, the system can determine whether the dynamic single request input was triggered by the completion of a main task ("M-Task") by a resource of the dynamic modeler (branch 503) or whether the dynamic single request input was triggered by a resource requesting the creation of a communicator task ("C-Task") (branch 506).

In response to determining that the dynamic single request input was triggered by the completion of an M-Task, the system automatically detects discrepancies within the M-Task using a Dynamic Rule Monitor (step 503). The Dynamic Rule Monitor can process the received dynamic single request input, including processing the resource's responses to the fields of the M-Task, in order to determine whether the M-Task violates one or more rules of the dynamic rule monitor. The rules can be determined from the output model profile of the dynamic modeler.

After automatically detecting discrepancies within the M-Task, the system can execute a T-Task corresponding to the M-Task to address the discrepancy (step 504). This process is described in more detail below, e.g., with reference to FIG. 7 and FIG. 8.

In response to determining that the dynamic single request input triggers generation of a C-Task, the system receives, from the resource, data characterizing the C-Task (step 506). In some cases, the resource generates a C-Task in response to a discrepancy that the resource identifies, and requires information from one or more other resources of the dynamic modeler in order to rectify the discrepancy. In some other cases, the resource simply does not have all information the resource needs to complete a task, and requests this information from other resources.

The resource can identify one or more fields in an M-Task to send to a recipient resource for input by the recipient resource. These fields of the M-Task are to be completed by the recipient resource and are included in the C-Task.

The system creates a targeted field action form to select specific fields from the M-Task (step 508). This targeted field action form includes all fields in the M-Task that the resource selected to include in the C-Task.

The system determines the resource that is the proper recipient of the generated C-Task (step 509). In some cases, the recipient resource can be a second user that has the credentials for responding to the targeted field action form. In some other cases, the recipient resource can be an Internet-of-Things (IoT) device that has data for responding to the targeted field action form.

The system sends, to the recipient resource, the C-Task to execute the necessary actions (step 510). The recipient resource can then submit responses to the targeted field action form of the C-Task.

Optionally, the system presents, to the initiating resource, an interface to validate the data submitted by the recipient resource (step 512). In particular, the initiating resource can approve the data, and the data will be posted back into the M-Task; i.e., the responses given by the recipient resource to the selected fields of the M-Task will be submitted as the responses to that M-Task. The initiating resource can also reject the responses of the recipient, and either complete the selected fields of the M-Task him/herself, or generate another C-Task. That is, the resource can instruct the process 500 to begin again at step 501. In some cases, this step can be omitted, e.g., if the system itself can confirm the accuracy of the responses to the targeted field action form submitted by the recipient resource.

The system triggers the necessary corrective action without the need for manual mapping (step 514). That is, the system does not require a user to manually configure the data of the dynamic modeler to correct the discrepancy; the system can automatically do so according to the approved responses to the C-Task. Thus, the system can ensure data integrity.

Figure 6A:
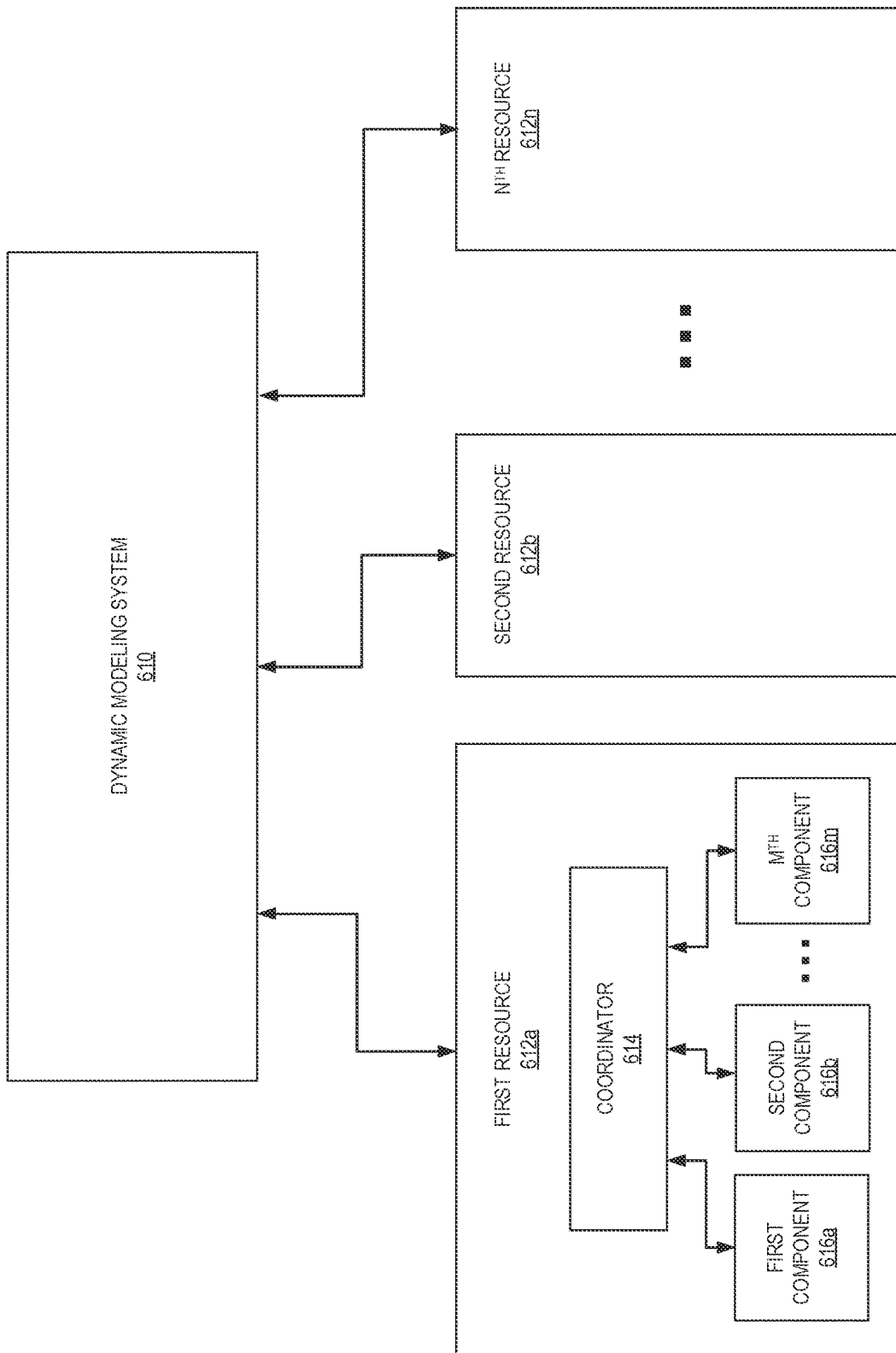
Figure 6B:
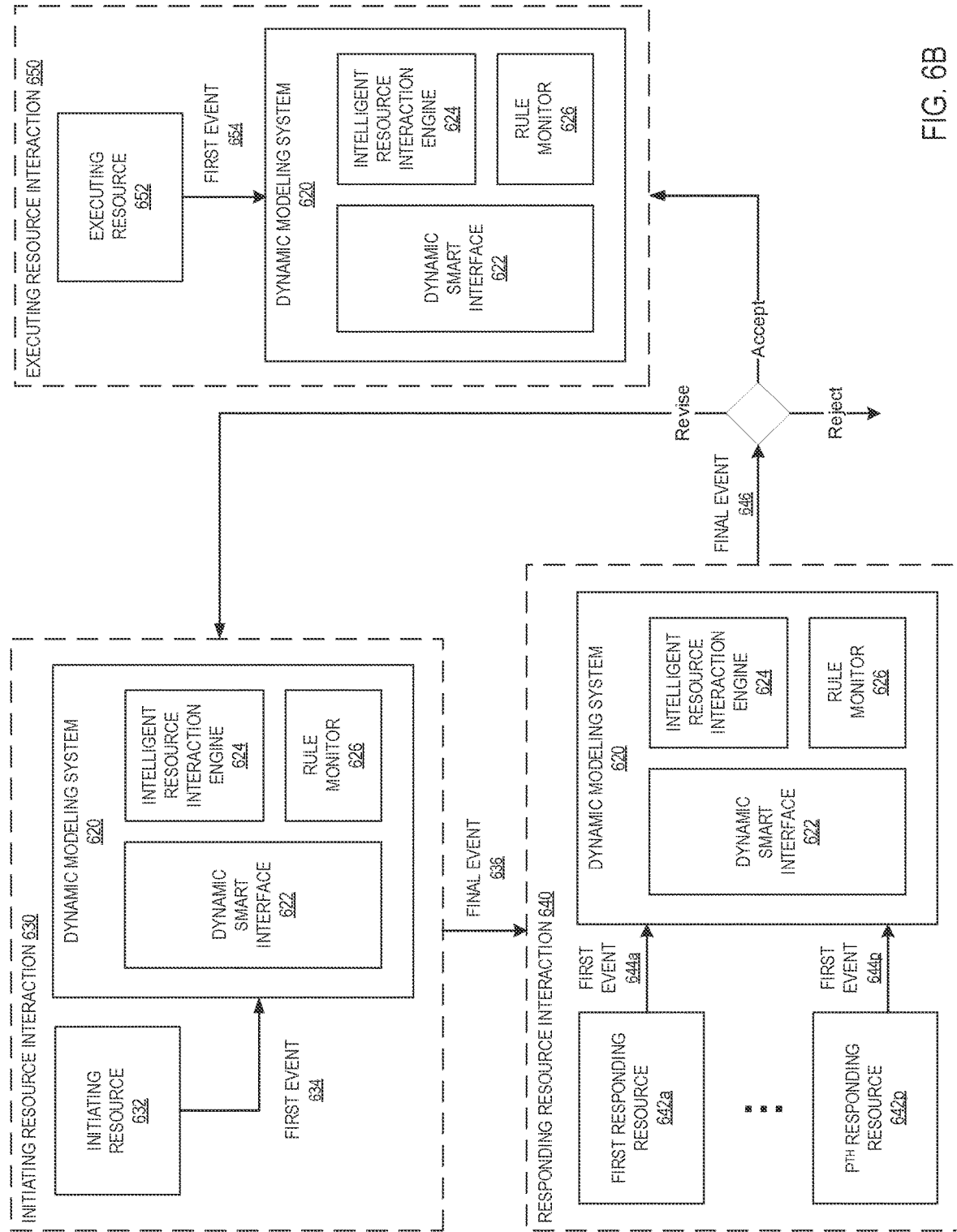

FIGS. 6A-6C are block diagrams of example interactions between a dynamic modeling system and resources of the dynamic modeling system.

Referring to FIG. 6A, a dynamic modeling system 610 interacts with N different resources 612a-n of the dynamic modeling system 610. For example, the dynamic modeling system 610 can have a similar architecture to the dynamic modeling system 110 depicted in FIG. 1.

Each resources 612a-n can be associated with each other resource by the dynamic modeling system 610; for example, the resources 612a-n can be resources of the same organization. In some instances, the resources 612a-n can include one or more user devices corresponding to users of the dynamic modeling system 610 and/or one or more IoT devices of the dynamic modeling system 610.

Each resource 612a-n can communicate with the dynamic modeling system 610 using a dynamic smart interface, e.g., the dynamic smart interface 240 depicted in FIG. 2. If the resources 612a-n is a user device of a user, then the dynamic smart interface 240 can include a central task hub, interactable graphical elements, a dynamic report viewer, etc., as described above. If the resource is an IoT device, then the dynamic smart interface can be an application programming interface (API) that offers functionality for communicating with the dynamic modeling system 610.

In some implementations, the dynamic modeling system 610 can monitor a status of each of the resources 612a-n. For example, each resource 612a-n can send status updates, e.g., at regular time intervals, to the dynamic modeling system 610, and the dynamic modeling system 610 can maintain data characterizing a current status of each resource 612a-n.

As a particular example, the dynamic modeling system 610 can constantly determine whether or not each resource 612a-n is online or available. Upon determining that a particular resource has gone offline, the dynamic modeling system 610 can send a notification to one or more other resources 612a-n notifying the resources that the particular resource has gone offline. The dynamic modeling system 610 can also generate or update one or more tasks in response to the unavailability of the particular resource. For example, the dynamic modeling system 610 can reassign the M-Tasks that had been assigned to the particular resource to other resources 612a-n. As another example, the dynamic modeling system 610 can generate an M-Task or a C-Task for one or more of resources 612a-n to determine a detailed status of the particular resource.

One or more of the resources 612a-n can be composed of multiple different components; as depicted in FIG. 6A, the first resource 612a includes M different components 616a-m. For example, the first resource 612a can be an autonomous or semi-autonomous vehicle, and the M components 616a-m can include different IoT or non-IoT devices of the vehicle, e.g., devices that determine in real time the tire pressure, gas levels, current location, etc., of the vehicle. Each component can send status updates to a coordinator 614 of the first resource 612a. The coordinator 614 can collect each status update and send a combined update to the dynamic modeling system 610.

In some implementations, the dynamic modeling system 610 can use one or more machine learning models to determine when to send notifications to the resources 612a-n. As a particular example, if one of the resources 612a-n or components 616a-m monitors the temperature of oil in a vehicle, then the machine learning models can learn one or more threshold temperatures that, if the temperature of the oil satisfies the threshold, require attention. The dynamic modeling system 610 can therefore determine to send a notification to one or more particular resources of the resources 612a-n if the temperature satisfies the threshold.

As another particular example, if one of the resources 612a-n or components 616a-m monitors the heart rate of a user, then the machine learning models can learn a range of heart rates that is normal for the user and a range of heart rates that is abnormal for the user. The dynamic modeling system 610 can therefore determine to send a notification to one or more particular resources of the resources 612a-n if the heart rate is determined to be abnormal, according to historical data of the user or other users.

As another particular example, if one of the resources 612a-n or components 616a-m represents a vendor that supplies a product, then the machine learning models can learn a normal range of changes of the price of the product, and an abnormal range of changes of the price of the product, according to historical data corresponding to the vendor. The dynamic modeling system 610 can then notify one or more particular resources of the resources 612a-n about a particular change in price. For example, if the change in price is determined to be normal, then the dynamic modeling system 610 can notify respective resources 612a-n that the change in price is likely legitimate, and the product should be purchased at the price. As another example, if the change in price is determined to be abnormal, then the dynamic modeling system 610 can notify one or more particular resources of the resources 612a-n that the change in price may indicate that purchasing the product would have risks.

FIGS. 6B and 6C depict particular examples of dynamic modeling systems interacting with multiple different resources in real-time. FIG. 6B relates to a dynamic modeling system 620 that uses one or more machine learning models to interact with the resources of the dynamic modeling system 620, and determines updates to the one or more machine learning models using an intelligent resource interaction engine 624 and contextual dynamic data obtained from the resources. FIG. 6C relates to a dynamic modeling system 660 that records contextual dynamic data related to tasks and transactions in a distributed ledger using a distributed ledger engine 664.

Referring to FIG. 6B, the dynamic modeling system 620 interacts with resources of the dynamic modeling system 620 across three stages: an initiating resource interaction 630, a responding resource interaction 640, and an executing resource interaction 650.

In the initiating resource interaction 630, an initiating resource 632 sends a single dynamic first event 634 to the dynamic modeling system 620 to initiate a transaction. The first event 634 can include contextual dynamic data required to initiate the transaction. The initiating resource 632 can send the first event 634 using a dynamic smart interface 622 of the dynamic modeling system 620. As described above, if the initiating resource 632 is a user, then the dynamic smart interface 622 can include UI elements displayed to the user on a user device. If the initiating resource 632 is an IoT device, then the dynamic smart interface 622 can include an API provided by the dynamic modeling system 620 by which the device can send events and complete tasks.

In response to receiving the first event 634, as described above, the dynamic modeling system 620 can generate an M-Task for the initiating resource 632 to provide further contextual dynamic data in order to generate the transaction. That is, if the contextual dynamic data of the first event 634 does not include all information required to generate the transaction, the dynamic modeling system 620 can assign an M-Task to the initiating resource to provide more information. To complete the M-Task, the dynamic smart interface 622 can provide further prompts to the initiating resource 632. For example, the dynamic smart interface 622 can use a cascading filter to prompt the user to provide more contextual dynamic data about the transaction that is to be initiated.

In some implementations, the intelligent resource interaction engine 624 of the dynamic modeling system 620 can use one or more machine learning models to determine the prompts that are to be provided to the initiating resource 632. The machine learning models can be trained using contextual dynamic data from previous transactions to determine common patterns in the contextual dynamic data. For example, the intelligent resource interaction engine 624 can provide the contextual dynamic data of the first event 634 as input to the one or more machine learning models, and as output receive a prediction about the contextual dynamic data of the responses to the further prompts provided to the initiating resource 632 by the dynamic modeling system 620. As a particular example, the one or more machine learning models can predict, for each of one or more prompts, a likely response to the prompts, and the dynamic smart interface 622 can use the predicted responses to generate the cascading filter of prompts, e.g., determining an order of prompts in the cascading filter according to the predictions.

In some implementations, the intelligent resource interaction engine 624 obtains data characterizing relevant corporate or government policies or regulations when generating the cascading filter of prompts provided to the initiating resource 632. For example, the initiating resource 632 can request quotes for a product, and the intelligent resource interaction engine 624 can determine information required by one or more vendors of the product (corresponding to respective responding resources 642*a-p*) to accept the transaction. For example, if the initiating resource 632 is purchasing an airplane ticket, then the intelligent resource interaction engine 624 can determine that some airlines require permission documents if a passenger is an unaccompanied minor. The intelligent resource interaction engine 624 can then generate a prompt requesting the age of the passenger; if the initiating resource 632 responds to the prompt with a value below 18, for example, then the intelligent resource interaction engine 624 can automatically provide a subsequent prompt asking if the passenger is travelling alone; if the initiating resource 632 responds to the subsequent prompt affirmatively, then the intelligent resource interaction engine 624 can automatically generate an M-Task for the initiating resource 632 to obtain permission documents that confirm that the unaccompanied minor is permitted to travel alone and that provide any other information required by the airline.

For example, the first event 634 can be to initiate a transaction for purchasing a product. As a particular example, the initiating resource 632 can request a quote from multiple other resources of the dynamic modeling system 620, referred to as "responding" resources 642*a-p*. As another particular example, the initiating resource 632 can identify a price that the initiating resource 632 is willing to pay, and the responding resources 642*a-p* can accept, reject, or revise the identified price. This process is described in more detail below.

After providing responses to each prompt in the cascading filter, the initiating resource 632 can submit a final event 636. Upon receiving the final event 636, the rule monitor 626 can generate M-Tasks for responding to the initiating resource 632, and assign the M-Tasks to the P responding resources 642*a-p*, P≥1. The rule monitor 626 can generate the M-Tasks according to the contextual dynamic data provided by the initiating resource 632.

After receiving the final event 636, the intelligent resource interaction engine 624 can use the contextual dynamic data provided by the initiating resource 632 to update the parameters of the one or more machine learning models. That is, the intelligent resource interaction engine 624 can generate training examples for the machine learning model using the contextual dynamic data provided by the initiating resource 632. Thus, the one or more machine learning models can continue to learn the patterns of the contextual dynamic data.

For example, the machine learning models can predict which responding resources 642*a-p* are most likely to accept the request, or which responding resources 642*a-p* are most likely to fulfill the requirements of the initiating resource 632. In some implementations, the intelligent resource interaction engine 624 can use the predictions of the machine learning models to determine which responding resources 642*a-p* to send the request to, and/or which responding resources 642*a-p* should be prioritized if multiple responding resources respond. The intelligent resource interaction engine 624 can use historical data corresponding to respective other tasks or transactions to determine the most reliable or responsive responding resources 642*a-p*. As an example, if a particular responding resource 642 requires payment up front, but the initiating resource 632 is not able to pay up from, e.g., is only able to pay after 60 days, then the intelligent resource interaction engine 624 can determine not to send the request to the particular responding resource 642.

After generating the M-Tasks for the responding resources 642a-p, the dynamic modeling system 620 can send a notification, e.g., by sending a notification C-Task, to each of the responding resources 642a-p informing the responding resources 642a-p that a new M-Task is has been assigned to them.

Referring to the responding resource interaction 640, each of the responding resources can submit a respective first event 644a-p of the assigned M-Tasks. The first events 644a-p can include contextual dynamic data identifying the assigned M-Tasks to the dynamic modeling system 620.

In response to receiving the first events 644a-p, the dynamic smart interface 622 can provide one or more prompts to each of the responding resources 642a-p. For example, the dynamic smart interface 622 can use a cascading filter to provide prompts to the responding resources 642a-p. As described above with respect to the initiating resource interaction 630, the intelligent resource interaction engine 624 can use one or more machine learning models to determine the prompts that are to be provided to the responding resources 642a-p. The machine learning models can be trained using contextual dynamic data from previous transactions to determine common patterns in the contextual dynamic data. In some implementations, the one or more machine learning models used in the responding resource interaction 640 are the same as the machine learning models used in the initiating resource interaction 630. In some other implementations, the one or more machine learning models used in the responding resource interaction 640 are different from the machine learning models used in the initiating resource interaction 630. As a particular example, the intelligent resource interaction engine 624 can predict, for each responding resource 642a-p, whether the responding resource will accept, reject, or negotiate a request of the initiating resource 632.

After providing responses to each prompt, each responding resource 642a-p can submit a respective final event 646. In some implementations, for each responding resource 642a-p, the final event 646 can include contextual dynamic data identifying whether the responding resource 642a-p accepted a request of the initiating resource 632 (e.g., accepted a price offered by the initiating resource 632), rejected the request of the initiating resource 632, or revised the request of the initiating resource 632 (e.g., by negotiating the request).

If the responding resource 642a-p has rejected the request, then the rule monitor 626 can determine to end the transaction for the responding resource 642a-p.

If the responding resource 642a-p has revised the request, then the rule monitor 626 can determine to generate a new M-Task for the initiating resource 632 to responds to the revision. For example, the rule monitor 626 can generate an M-Task for the initiating resource 632 to continue negotiating with the responding resource 642a-p, e.g., accepting, rejecting, or negotiating the revision submitted by the responding resource 642a-p. In some implementations, the initiating resource 632 can negotiate with multiple different responding resources 642a-p in parallel.

If the responding resource 642a-p has accepted the request, then the rule monitor 626 can determine to generate a new M-Task for the responding resource 642a-p to execute the request, e.g., to provide the product that has been sold to the initiating resource 632. In some implementations, when one of the responding resources 642a-p accepts the request, then the rule monitor 626 determines to end the transaction for each other responding resource 642a-p; that is, only a single responding resource can accept the request. In some other implementations, multiple different responding resources 642a-p can each accept the request.

As described above with respect to the initiating resource interaction 630, after receiving the final event 646 corresponding to a respective responding resource 642a-p, the intelligent resource interaction engine 624 can use the contextual dynamic data provided by the responding resource 642a-p to update the parameters of the one or more machine learning models of the responding resource interaction 640. As a particular example, if a particular responding resource 642a-p submits a final event 646 that rejects the request, then the machine learning model can learn to predict a higher likelihood that a responding resource similar to the particular responding resource 642a-p (e.g., of a same type, at the same time of day, etc.) will reject a request.

Referring to the executing resource interaction 650, when one of the responding resources 642a-p accepts a request submitted by the initiating resource 632, the responding resource 642a-p is referred to as an "executing" resource 652, and executes an M-Task corresponding to the request.

In particular, the executing resource 652 submits a first event 654 to the dynamic modeling system 620 to begin the M-Task corresponding to the request. In response to receiving the first event 654, the dynamic smart interface 622 can provide one or more prompts to the executing resource 652. For example, the dynamic smart interface 622 can use a cascading filter to provide prompts to the executing resource 652. As described above with respect to the initiating resource interaction 630 and the responding resource interaction 640, the intelligent resource interaction engine 624 can use one or more machine learning models to determine the prompts that are to be provided to the executing resource 652.

The machine learning models can be trained using contextual dynamic data from previous transactions to determine common patterns in the contextual dynamic data. In some implementations, the one or more machine learning models used in the executing resource interaction 650 are the same as the machine learning models used in the initiating resource interaction 630 and/or the responding resource interaction 640. In some other implementations, the one or more machine learning models used in the executing resource interaction 650 are different from the machine learning models used in the initiating resource interaction 630 and/or the responding resource interaction 640.

For example, the machine learning models can process contextual dynamic data of the task during execution of the task by the executing resource 652. The intelligent resource interaction engine 624 can monitor the performance of the executing resource and alert the executing resource 652 or other resources of potential failures. By training on historical execution data, the intelligent resource interaction engine 624 can provide advanced alerts to the executing resource 652 or other resources (e.g., the initiating resource 632) of possible execution failure if there are trends in the execution data which match previous failures.

In some implementations, the intelligent resource interaction engine 624 can monitor a status of the executing resource 652, or one or more components of the executing resource 652. For example, if the intelligent resource interaction engine 624 determines, using contextual dynamic data corresponding to the task (e.g., in conjunction with the rule monitor 626), that N components of the executing resource 652 need to be available to execute the task, then the intelligent resource interaction engine 624 can monitor the status of the components, and halt the execution of the task if the number of available components drops below N.

For example, if the executing resource 652 is a distributed computing system that includes multiple computing nodes that operate in parallel to execute the task (e.g., that perform parallel computing threads to generate an output), then the intelligent resource interaction engine 624 can monitor the status of the computing nodes and halt the execution of the task if the number of available computing nodes drops below a threshold.

The executing resource 652 can submit a final event to the dynamic modeling system 620 that completes the M-Task. In some implementations, the dynamic modeling system 620 can send a notification, e.g., by sending a notification C-Task, to the initiating resource 632 notifying the initiating resource that the M-Task has been completed and therefore that the request has been fulfilled.

As described above, after receiving the final event of the M-Task corresponding to the request, the intelligent resource interaction engine 624 can use the contextual dynamic data provided by the executing resource 652 to update the parameters of the one or more machine learning models of the executing resource interaction 650.

Referring to FIG. 6C, similar to the process above described with respect to FIG. 6B, the dynamic modeling system 660 interacts with resources of the dynamic modeling system 660 across three stages: an initiating resource interaction 670, a responding resource interaction 680, and an executing resource interaction 690.

In the initiating resource interaction 670, an initiating resource 672 sends a single dynamic first event 674 to the dynamic modeling system 660 to initiate a transaction. The first event 674 can include contextual dynamic data required to initiate the transaction. The initiating resource 672 can send the first event 674 using a dynamic smart interface 662 of the dynamic modeling system 660.

In response to receiving the first event 674, as described above, the dynamic modeling system 660 can generate an M-Task for the initiating resource 672 to provide further contextual dynamic data in order to generate the transaction. To complete the M-Task, the dynamic smart interface 662 can provide further prompts to the initiating resource 672. For example, the dynamic smart interface 662 can use a cascading filter to prompt the user to provide more contextual dynamic data about the transaction that is to be initiated.

After providing responses to each prompt in the cascading filter, the initiating resource 672 can submit a final event 676. Upon receiving the final event 676, the rule monitor 666 can generate M-Tasks for responding to the initiating resource 672, and assign the M-Tasks to the P responding resources 682a-p, P≥1. The rule monitor 666 can generate the M-Tasks according to the contextual dynamic data provided by the initiating resource 672.

After receiving the final event 676, the dynamic modeling system 660 can record the current status of the initiated transaction in a distributed ledger using a distributed ledger engine 664 of the dynamic modeling system 660. The distributed ledger can be accessible by one or more of the resources of the dynamic modeling system 660 to verify the current status or a historical status of a transaction. For example, the distributed ledger engine can record an "initiating record" in the distributed ledger, with an associated timestamp identifying the time at which the M-Task of the initiating resource 672 was completed. Saving contextual dynamic information to a distributed ledger is discussed in more detail below with respect to FIG. 9.

After generating the M-Tasks for the responding resources 682a-p, the dynamic modeling system 660 can send a notification, e.g., by sending a notification C-Task, to each of the responding resources 682a-p informing the responding resources 682a-p that a new M-Task is has been assigned to them.

Referring to the responding resource interaction 680, each of the responding resources can submit a respective first event 684a-p of the assigned M-Tasks. The first events 684a-p can include contextual dynamic data identifying the assigned M-Tasks to the dynamic modeling system 660.

In response to receiving the first events 684a-p, the dynamic smart interface 662 can provide one or more prompts to each of the responding resources 682a-p. For example, the dynamic smart interface 662 can use a cascading filter to provide prompts to the responding resources 682a-p.

After providing responses to each prompt, each responding resource 682a-p can submit a respective final event 686. In some implementations, for each responding resource 682a-p, the final event 686 can include contextual dynamic data identifying whether the responding resource 682a-p accepted a request of the initiating resource 672, rejected the request of the initiating resource 672, or revised the request of the initiating resource 672.

If the responding resource 682a-p has rejected the request, then the rule monitor 666 can determine to end the transaction for the responding resource 682a-p.

If the responding resource 682a-p has revised the request, then the rule monitor 666 can determine to generate a new M-Task for the initiating resource 672 to respond to the revision. For example, the rule monitor 666 can generate an M-Task for the initiating resource 672 to continue negotiating with the responding resource 682a-p, e.g., accepting, rejecting, or negotiating the revision submitted by the responding resource 682a-p. In some implementations, the initiating resource 672 can negotiate with multiple different responding resources 682a-p in parallel.

If the responding resource 682a-p has accepted the request, then the rule monitor 666 can determine to generate a new M-Task for the responding resource 682a-p to execute the request. In some implementations, when one of the responding resources 682a-p accepts the request, then the rule monitor 666 determines to end the transaction for each other responding resource 682a-p; that is, only a single responding resource can accept the request. In some other implementations, multiple different responding resources 682a-p can each accept the request.

After receiving the final event 686 of a respective responding resource 682a-p, the dynamic modeling system 660 can record the current status of the initiated transaction in a "response record" of the distributed ledger using the distributed ledger engine 664. In some implementations, the distributed ledger engine 664 records each final event 686 of respective responding resources 682a-p. In some other implementations, the distributed ledger engine 664 only records the final event 686 of responding resources 682a-p that accepted the request of the initiating resource 672.

Referring to the executing resource interaction 690, when one of the responding resources 682a-p accepts a request submitted by the initiating resource 672, the responding resource 682a-p is referred to as an "executing" resource 692, and executes an M-Task corresponding to the request.

In particular, the executing resource 692 submits a first event 694 to the dynamic modeling system 660 to begin the M-Task corresponding to the request. In response to receiving the first event 694, the dynamic smart interface 662 can provide one or more prompts to the executing resource 692.

For example, the dynamic smart interface 662 can use a cascading filter to provide prompts to the executing resource 692.

The executing resource 692 can submit a final event to the dynamic modeling system 660 that completes the M-Task. In some implementations, the dynamic modeling system 660 can send a notification, e.g., by sending a notification C-Task, to the initiating resource 672 notifying the initiating resource that the M-Task has been completed and therefore that the request has been fulfilled.

After receiving the final event of the M-Task corresponding to the request, the distributed ledger engine 664 can record an "execution record" in the distributed ledger that represents the final state of the transaction.

In some implementations, the executing resource 692 must meet certain requirements in order for the distributed ledger engine 664 to record the execution record in the distributed ledger. For example, the distributed ledger engine 664 can only record the execution record after the executing resource 692 has completed a predetermined number of tasks of the transaction record, e.g., completed the number of tasks that the executing resource 692 agreed to complete.

If at any point in the transaction there is a dispute about the transaction, e.g., a dispute about the terms and conditions agreed to but the responding resource 682a-p and the initiating resource 672, then the resources of the dynamic modeling system 660 can obtain records of the transaction from the distributed ledger, which represent a "ground-truth" state of the contextual dynamic data of the transaction.

As a particular example, the response record and the execution record of the distributed ledger can be compared against each other to make sure the executing resource 692 fulfilled the obligations to the initiating resource 672 to which the executing resource 692 agreed. That is, the dynamic modeling system 660 can determine, from the response record, one or more deliverables that were promised by the executing resource. The dynamic modeling system 660 can also determine, from the execution record, whether the one or more deliverables were actually delivered by the executing resource. If the dynamic modeling system 660 determines that there is a difference between the response record and the execution record, then the dynamic modeling system 660 can notify one or more of the resources involved, e.g., by generating a notification C-Task for the initiating resource 672.

Figure 7:
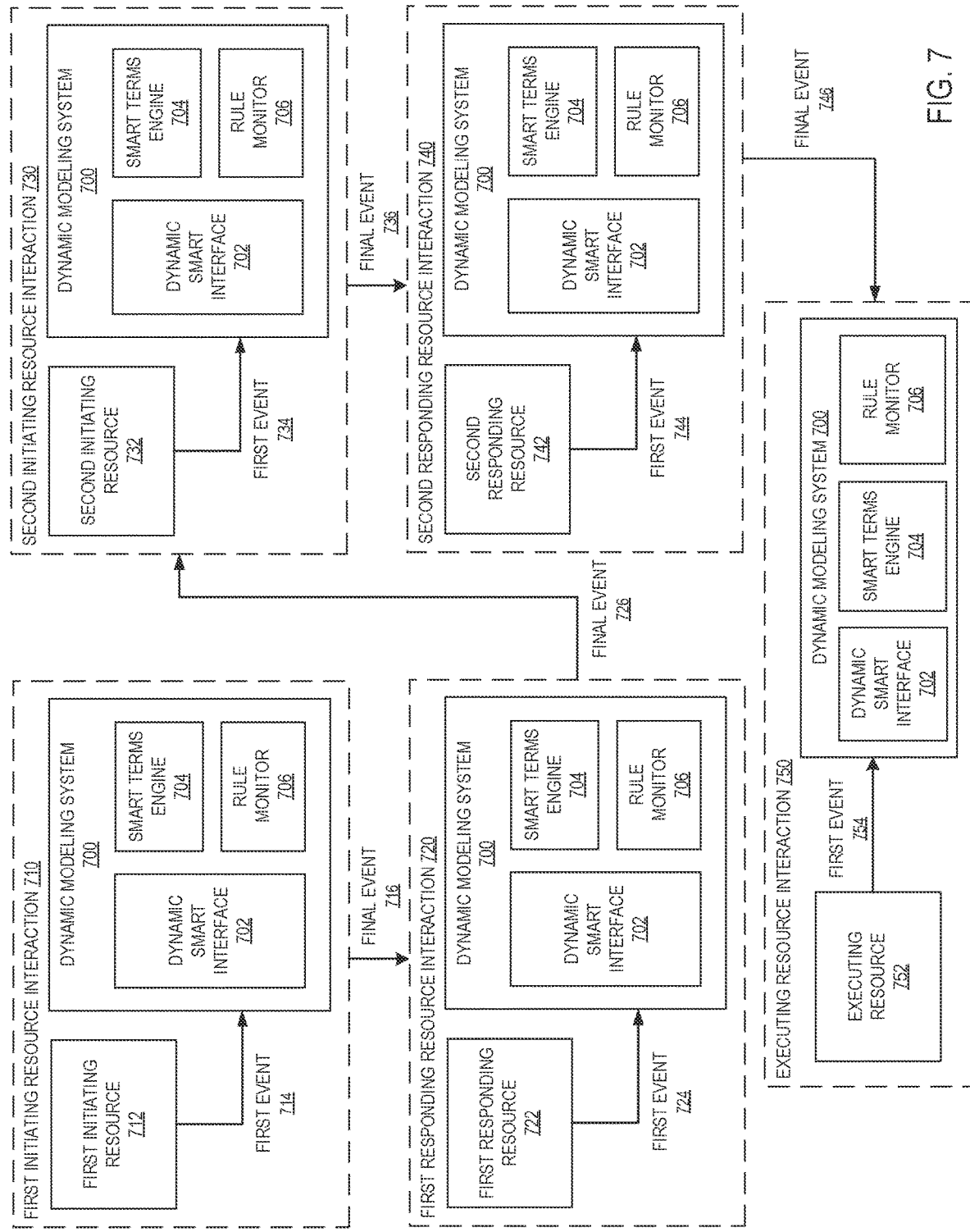

FIG. 7 depicts an example of a dynamic modeling system 700 interacting with multiple different resources in real-time. In particular, the dynamic modeling system 700 facilitates resources reassigning certain tasks to other resources of the dynamic modeling system 700.

The dynamic modeling system 700 interacts with resources of the dynamic modeling system 700 across five stages. In a first initiating resource interaction 710, a first initiating resource 712 initiates a task. In a first responding resource interaction 720, a first responding resource accepts 722 the task. In a second initiating resource interaction 730, the first responding resource 722 acts as a second initiating resource 732 to initiate the task with second responding resources of the dynamic modeling system 700. In a second responding resource interaction 740, a particular second responding resource acts as a second responding resource 742 to accept the task. In an executing resource interaction 750, the particular second responding resource acts as an executing resource 752 to execute the task.

Throughout the interactions 710-750 between the dynamic modeling system 700 and respective resources of the dynamic modeling system, a smart terms engine 704 can continuously maintain data characterizing different terms and conditions agreed to by respective resources, and evaluate which resources should be notified about particular terms and conditions. In some implementations, the smart terms engine 704 can be a component of a dynamic process manger, e.g., the dynamic process manager 250 discussed above with respect to FIG. 2. The dynamic process manager can also include a task chain system, as discussed above.

Referring to the first initiating resource interaction 710, the first initiating resource 712 sends a single dynamic first event 714 to the dynamic modeling system 700 to initiate the task. The first event 714 can include contextual dynamic data required to initiate the task. The first initiating resource 712 can send the first event 714 using a dynamic smart interface 702 of the dynamic modeling system 700. As described above, if the first initiating resource 712 is a user, then the dynamic smart interface 702 can include UI elements displayed to the user on a user device. If the first initiating resource 712 is an IoT device, then the dynamic smart interface 702 can include an API provided by the dynamic modeling system 700 by which the device can send events and complete tasks.

In response to receiving the first event 714, as described above, the dynamic modeling system 700 can generate an M-Task for the first initiating resource 712 to provide further contextual dynamic data in order to generate the transaction. To complete the M-Task, the dynamic smart interface 702 can provide further prompts to the first initiating resource 712.

As a particular example, the first initiating resource 712 can submit a request for transportation, e.g., a request for a taxi. The dynamic modeling system 700 can then determine further prompts to present to the first initiating resource 712, according to a rule monitor 706 of the dynamic modeling system 700. For example, the dynamic modeling system 700 can prompt the first initiating resource 712 to identify a starting location, an ending location, and a time at which the transportation is required.

After providing responses to each prompt, the first initiating resource 712 can submit a final event 716. Upon receiving the final event 716, the rule monitor 706 can generate M-Tasks for responding to the first initiating resource 712, and assign the M-Tasks to P responding resources, as described above with respect to FIGS. 6B and 6C. The rule monitor 706 can generate the M-Tasks according to the contextual dynamic data provided by the first initiating resource 712.

Referring to the first responding resource interaction 720, a first responding resource 722 can submit a first event 724 to begin the assigned M-Tasks. In response to receiving the first event 724, the dynamic smart interface 702 can provide one or more prompts to the first responding resource 722. In particular, the first responding resource 722 can accept the task initiated by the first initiating resource 712, as described above with respect to FIGS. 6B and 6C.

After the first responding resource 722 accepts the task, the smart terms engine 704 can determine terms and conditions of the agreement between the first initiating resource 712 and the first responding resource 722, according to the contextual dynamic data provided by both resources. If necessary, as determined according to one or more predetermined rules and/or one or more machine learning models, the smart terms engine 704 can notify one or both of the resources of the terms and conditions of the agreement, e.g., using a notification C-Task. Instead or in addition, the smart terms engine 704 can generate a task, e.g., a decision C-Task, for one or both resources to actively accept the terms and conditions if they have not done so already.

After accepting the task, the first responding resource 722 can determine to subcontract the task to a different resource of the dynamic modeling system 700 corresponding to a different institution than the institution of the first responding resource 722. That is, the first responding resource 722 can determine to enter into an agreement, using a new transaction of the dynamic modeling system 700 that is associated with the original transaction between the first responding resource 722 and the first initiating resource 712, with a second responding resource of the dynamic modeling system 700 to complete the task in place of the first responding resource 722.

Referring to the second initiating resource interaction 730, to reassign the task, the first responding resource 722 can initiate a new "reassigned" task with the dynamic modeling system, by acting as a second initiating resource 732. In particular, the second initiating resource 732 sends a single dynamic first event 734 to the dynamic modeling system 700 to initiate the reassigned task. The first event 734 can include contextual dynamic data required to initiate the reassigned task. As described above, in response to receiving the first event 734, the dynamic modeling system 700 can generate an M-Task for the second initiating resource 732 to provide further contextual dynamic data in order to generate the transaction.

After providing responses to each prompt of the M-Task, the second initiating resource 732 can submit a final event 736. Upon receiving the final event 736, the rule monitor 706 can generate M-Tasks for responding to the second initiating resource 732, and assign the M-Tasks to Q second responding resources of the dynamic modeling system 700 that will act as responding resources.

Referring to the second responding resource interaction 740, a second responding resource 742 can submit a first event 744 to begin the assigned M-Tasks. In response to receiving the first event 744, the dynamic smart interface 702 can provide one or more prompts to the second responding resource 742. In particular, the second responding resource 742 can accept the task initiated by the second initiating resource 732.

After the second responding resource 742 accepts the task, the smart terms engine 704 can determine terms and conditions of the agreement between the second initiating resource 732 and the second responding resource 742, according to the contextual dynamic data provided by both resources. For example, the smart terms engine 704 can determine whether the terms and conditions between the second initiating resource 732 and the second responding resource 742 are different from the terms and conditions between the first initiating resource 712 and the first responding resource 722. If the terms and conditions are different, the smart terms engine 704 can send a notification to the first initiating resource 712 identifying the differences. Instead or in addition, the smart terms engine 704 can generate a task for the first initiating resource 712 to actively accept the terms and conditions of the second responding resource 742. Thus, the smart terms engine 704 can maintain traceability of the different terms and conditions of the respective resources of the dynamic modeling system 700.

In some implementations, the dynamic modeling system 700 can facilitate a new negotiation between the first initiating resource 712 and the second responding resource 742. For example, the dynamic modeling system can generate chat C-Tasks for the respective resources to interact in real-time to revise or otherwise negotiate the terms and conditions by which the task will be completed by the second responding resource 742.

Continuing the above transportation example, the first responding resource 722 might reassign the transportation task to a second responding resource, e.g., a gig economy transportation company. The smart terms engine 704 can determine, for example, a level of insurance provided by the second responding resource. As a particular example, the smart terms engine 704 can determine which resource would bear the liability in the case of an accident.

As another example, the first initiating resource 712 can initiate a task to purchase a car. The responding resource 722 can reassign the sale to a second responding resource, e.g., a local franchise of an automotive company. In this example, the smart terms engine 704 can determine what certificates or guarantees related to the purchased vehicle are provided by the second responding resource. For example, the smart terms engine 704 might determine that a particular pollution or safety certificate that is often provided is not provided in this case, and can alert the initiating resource 712.

Referring to the executing resource interaction 750, the second responding resource 742 acts as the executing resource 752 and executes an M-Task corresponding to the request. In particular, the executing resource 752 submits a first event 754 to the dynamic modeling system 700 to begin the M-Task corresponding to the request. In response to receiving the first event 754, the dynamic smart interface 702 can provide one or more prompts to the executing resource 752. The executing resource 752 can then submit a final event to the dynamic modeling system 700 that completes the M-Task.

In some implementations, the smart terms engine 704 includes one or more universal smart terms categories that each represent a predefined relationship between initiating resources, responding resources, and executing resources. Each universal smart terms category can identify one or more required and/or optional terms and conditions between respective parties of a transaction or task.

When the dynamic modeling system 700 receives a first event 714 from a first initiating resource 712, the dynamic modeling system 700 can automatically determine, according to data stored in the smart terms engine 704 defining the one or more universal smart terms categories, whether the transaction and/or task initiated by the first event 714 applies to one of the universal smart terms categories.

For example, the universal smart terms categories can include one or more of the following: a Manufacturer category, a Seller category, a Finance category, an Insurer category, a Surveyor category, or a Trade Performance category.

The Manufacturing universal smart terms category can be automatically triggered when an initiating resource 712 submits a dynamic first event 714 that represents a request to purchase one or more manufactured products from a manufacturer. To initiate tasks or transactions that apply to this category, one or more responding resources corresponding to manufacturers of the dynamic modeling system 700 can respond to the request and agree to smart terms and conditions dictated by the predefined rules of the Manufacturing category. Alternatively, or in addition, a manufacturing resource can submit a dynamic first event 714 that represents a request to sell manufactured products at a particular price, and one or more consumer resources of the dynamic modeling system 700 can respond as responding resource 722a-p.

The Seller universal smart terms category can be automatically triggered when an initiating resource 712 submits a dynamic first event 714 that represents a request to purchase one or more products from a seller, e.g., a seller resource that is not the manufacturer of the products. To initiate tasks or transactions that apply to this category, one or more responding resources corresponding to sellers of the dynamic modeling system 700 can respond to the request and agree to the smart terms and conditions dictated by the Seller category. Alternatively, or in addition, a seller resource can submit a dynamic first event 714 that represents a request to sell products at a particular price, and one or more buyer resources of the dynamic modeling system 700 can respond as responding resource 722*a-p*.

For example, when negotiating the terms of a transaction that will be governed by the Seller universal smart terms category, the resource representing the seller of the products can be prompted by the smart assistant of the dynamic modeling system 700 to agree to certain terms and conditions that are predefined according to the rules of the Seller category. For example, the smart assistant can provide one or more of the following prompts:

"To be sold, the product must include warranty X. Do you wish to include it?"

"To be transported from [RSA] to [DXB] you should purchase GIT Insurance. Do you wish to proceed?"

"The sale contract between states that you will be paid delivery+30 days. Do you wish to purchase or negotiate Financial Default security?"

"The sale contract between requires you to deliver DDP. Do you want to include a disclaimer for any delivery delays in the contract due to customs agents?"

Similarly, when negotiating the terms of a transaction that will be governed by the Seller universal smart terms category, the resource representing the buyer of the products can be prompted by the smart assistant of the dynamic modeling system 700 to agree to certain terms and conditions that are predefined according to the rules of the Seller category. For example, the smart assistant can provide one or more of the following prompts:

"The item you are buying does/does not include warranty X. Do you wish to proceed?"

"The item you are buying is/is not covered by GIT Insurance. Do you with to proceed or negotiate terms?"

"The Seller has requested Financial Default Security. Do you wish to offer?" "The Seller has asked for partial payment if item is held at customs for +15 days, with balance to be paid on delivery. Do you wish to agree?"

The Finance universal smart terms category can be automatically triggered when a resource of the dynamic modeling system 700 that represents a bank or other financial institution enters into a task or transaction. The smart terms and conditions of the Finance category can identify one or more required agreements of respective parties of any financial interaction, e.g., terms or contracts that are required by a government regulator, e.g., the US Securities and Exchange Commission.

The Insurer universal smart terms category can be automatically triggered when a resource of the dynamic modeling system 700 that represents an insurance company enters into a task or transaction. The smart terms and conditions of the Insurer category can identify one or more required agreements of respective parties of an insurance interaction.

The Surveyor universal smart terms category can be automatically triggered when an initiating resource 712 submits a dynamic first event 714 that represents a request to a surveying resource to inspect the quality of a product, e.g., a surveying resource to inspect produce. To initiate tasks or transactions that apply to this category, one or more responding resources corresponding to surveyors of the dynamic modeling system 700 can respond to the request and agree to the smart terms and conditions dictated by the Surveyor category.

In some implementations, one or more of the universal smart terms categories are mandatory. That is, when an initiating resource, responding resource, and/or executing resource agrees to be a party of a transaction or task governed by a universal smart terms category, then the resource is required to agree to the predefined rules dictated by the universal smart terms category. For example, a manufacturing category can be mandatory, e.g., to ensure the safety of the products provided by the manufacturer. In some such implementations, when agreeing to the terms and conditions of the universal smart terms category, the dynamic modeling system 700 will generate a contract from a template with the fields of the contract auto-populated according to the predefined rules of the universal smart terms category. The dynamic smart interface 702 of the dynamic modeling system 700 can then present the auto-generated contract to each resource, e.g., using the smart assistant described above. Each resource can then accept or reject the auto-generated contract.

In some implementations, one or more of the universal smart terms categories are optional. That is, when a resource agrees to be a party of a transaction or task governed by a universal smart terms category, then the resource can select whether or not to agree to the predefined rules of the universal smart terms category.

In some implementations, one or more of the universal smart terms categories can be negotiated by the resources of a task or transaction governed by the universal smart terms category. For example, the smart terms engine 704 can establish standard values for one or more fields of the universal smart terms category, and identify the one or more fields as negotiable. Then, the respective resources can negotiate to change the standard values, e.g., as described above with reference to FIG. 8.

In some implementations, as described above with reference to FIG. 8, when the resources of a transaction or task have agreed to the predefined rules of a universal smart terms category and/or have negotiated the negotiable fields of the universal smart terms category, the accepted terms and conditions of the task or transaction are recorded in a distributed ledger so that the resources can access and review the terms and conditions in the future, e.g., after the task or transaction is completed.

After a task or transaction is completed, the rule monitor 706 can automatically determine whether the terms and conditions of the task or transaction were met by each party, e.g., using the dynamic contextual data of the task or transaction and using the predefined rules of the universal smart terms category that governs the task or transaction. If the rule monitor 706 identifies a discrepancy, as described above with respect to FIG. 5, then the rule monitor 706 can automatically notify the relevant resources, e.g., the resource that caused the discrepancy and one or more resources that were affected by the discrepancy. For example, if an initiating resource agreed to pay a certain amount to an executing resource to receive a product provided by the executing resource, but did not pay the full amount, then the rule monitor 706 can alert both the initiating resource and the executing resource.

One or more parties affected by the discrepancy (in the example above, the executing resource) can then decide whether to file a claim against the resource that caused the discrepancy. The available claims can be dictated by the agreed-upon smart terms of the universal smart terms category. The rule monitor 706 can automatically determine the available claims according to the rules of the corresponding universal smart terms category. If the resource affected by the discrepancy elects to file a claim, then the smart terms engine 704 can automatically initiate the claim and notify the counterparties, e.g., using a notification C-Task. This process is described in more detail below with respect to FIG. 8.

Figure 8:
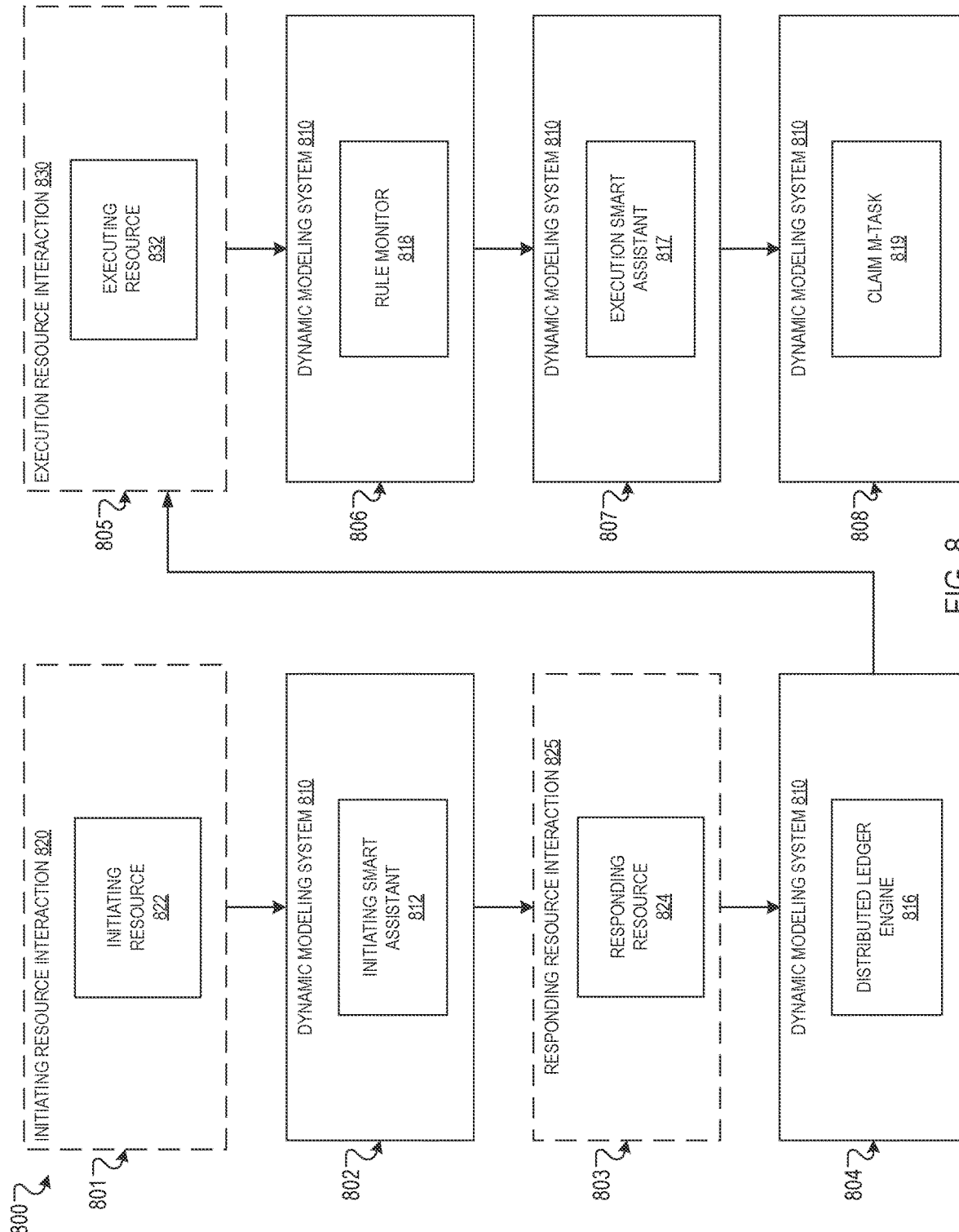
FIG. 8 is a block diagram of an example data flow whereby resources of a dynamic modeling system execute Terms tasks.

FIG. 8 is a block diagram of an example data flow 800 for a resource of a dynamic modeling system 810 to execute Terms tasks. The dynamic modeling system 810 can be, for example, configured similarly to the dynamic modeling system 110 described above.

In this specification, a Terms task, or a "T-task", is a task of a dynamic modeling system that is related to generating the smart terms of a transaction that have been agreed to by the parties of the transaction. Example T-tasks are described in more detail below.

In an initiating resource interaction 820, an initiating resource 822 of the dynamic modeling system 810 generates a transaction of the dynamic modeling system 810 (step 801). For example, the initiating resource 822 can generate a transaction as described above with respect to FIG. 6C. That is, the initiating resource 822 can submit a dynamic first event to initiate the transaction, causing the dynamic modeling system 810 to generate a respective M-Task for each of one or more responding resources to respond to the request of the initiating resource 822.

As an illustrative example, the initiating resource 822 can be a seller of a product, and the responding resources can be potential buyers of the product.

After the initiating resource 822 submits a final event completing the M-Task of generating the transaction, a smart terms engine of the dynamic modeling system 810 can automatically generate a T-Task for setting the smart terms of the transaction and assign the T-Task to the initiating resource 822 (step 802). For example, the T-Task can include providing prompts to a user of the dynamic modeling system 810 using an initiating smart assistant 812 for setting parameters for each of the smart terms of the transaction. The smart terms can include one or more of: terms and conditions, payment terms, warranties, trade terms, insurance terms, surveyor terms, digital terms, or credit terms. In some implementations, the smart terms engine generates a respective different T-Task corresponding to each category of smart terms, e.g., a first T-Task for setting the terms and conditions of the transaction, a second T-Task for setting the payment terms of the transaction, a third T-Task for setting the warranties of the transaction, a fourth T-Task for setting the credit terms of the transaction, etc. In some implementations, the smart terms can also identify how intellectual property associated with the transaction will be assigned to respective resources of the transaction.

Continuing the above illustrative example, the smart terms (after they are confirmed by all parties of the transaction) can specify that the products are to be delivered within a first timeline (e.g., 30 days), and the payment is to be made in a second timeline (e.g., up-front or within 30 days of delivery). The smart terms can also specify one or more other resources of the dynamic modeling system 810 that are to be associated with the transaction, e.g., a banking resource that will facilitate the payment, an insurance resource that will insure the products, transportation, etc., or a surveyor resource that is to survey the products to evaluate their condition.

In other words, when the initiating resource 822 submits a final event, for initiating a new transaction, the dynamic modeling system 810 can use the saved transaction context (e.g., the contextual dynamic data of the final event) to power the smart terms engine. The smart terms engine can use the smart terms categories to return the necessary T-Tasks (with the associated smart terms and the linked smart claims) via the initiating smart assistant 812.

The initiating resource 822 can then update the T-Tasks to set the smart terms and smart claims of the new transaction. The initiating resource 822 can complete the T-Tasks by submitting a second final event, the dynamic modeling system 810 can generate a decision C-Task to the responding resource of the new transaction to accept/reject/revise the set smart terms and smart claims, as described below.

In a responding resource interaction 825, a responding resource 824 completes the assigned M-Task of responding to the request (step 803), as described above with respect to FIG. 6C. For example, the responding resource 824 can submit a dynamic first event to complete the assigned M-Task and agree to the transaction. Continuing the particular example above, the initiating resource 822 and the responding resource 824 can agree that the responding resource 824 will purchase a particular volume of the product at a particular price per unit from the initiating resource 822.

After the initiating resource 822 generates the smart terms of the transaction using the one or more T-Tasks and the responding resource 824 agrees to the transaction, the dynamic modeling system 810 (e.g., a rule monitor 818 of the dynamic modeling system 810) can generate a decision C-task for accepting the smart terms, and assign the decision C-task to the responding resource 824. That is, the decision C-task is a task of the dynamic modeling system 810 that allows a resource to review the smart terms and either accept, reject, or revise the smart terms. The smart terms can be presented to the resource using the smart assistant 812, with prompts to accept, decline, or revise each of one or more items in the smart terms.

As described above, if a resource rejects the smart terms, then the transaction can be cancelled. If a first resource of the transaction, e.g., the responding resource 824, revises the smart terms, then the dynamic modeling system 810 can generate another decision C-task for the second resource of the transaction, e.g., the initiating resource 822, to accept, reject, or revise the revised smart terms submitted by the first resource. In some implementations, only a subset of the smart terms can be negotiated; the remaining smart terms can be non-negotiable and thus can only be accepted or rejected.

For example, the decision C-task assigned to a resource can include a list of the smart terms, with a Yes/No or a Yes/No/Revise prompt next to each term and condition. The resource can then select, e.g., using a dynamic smart interface of the dynamic modeling system 810, an option for each of the smart terms.

In some implementations, the decision C-task assigned to a resource can prompt the resource to select one or more optional smart terms identified as options by the smart assistant 812 in step 802. For example, the smart assistant 812 can identify that the initiating resource 822 does not automatically provide insurance for the products sold, so that the responding resource 824 would need to purchase insurance from a different resource of the dynamic modeling system 810 if the responding resource 824 determines that insurance is required. The decision C-task can therefore prompt the responding resource 824 to either confirm that no insurance is required, or to select a particular insurance resource of the dynamic modeling system 810 from which to purchase insurance.

The smart terms can identify, for each of one or more future scenarios of the transaction, a respective particular resource of the dynamic modeling system 810 against whom a claim can be filed.

The particular resource corresponding to a respective scenario can be a different resource than either the initiating resource 822 or the responding resource 824. For example, the smart terms can identify an insurance resource of the dynamic modeling system 810 again whom a claim can be filed if the products are damages during transportation. As another example, the smart terms can identify a manufacturing resource, that is different than the seller initiating resource 822, against whom a claim can be filed if the products are defective. As another example, the smart terms can identify a surveyor resource of the dynamic modeling system 810 against whom a claim can be filed if the products are not in the state that was reported by the surveyor resource after the surveyor resource surveys the products, as described above. As another example, the smart terms can identify a banking resource of the dynamic modeling system 810 against whom a claim can be filed if payment for the products is not execute within the identified timeline.

The smart terms can further identify, for each of the one or more future scenarios of the transaction, parameters of a claim that can be filed against the corresponding resource of the dynamic modeling system 810. For example, the smart terms can identify that, in the event the products are damaged during transportation, the responding resource 824 is to be refunded the payment amount. As another example, the smart terms can identify that, in the event the products are defective, the products are to be returned by the responding resource 824 and exchanged for a non-defective set of products.

In some implementations, as described above, the smart terms engine can use respective universal smart terms categories assigned to the initiating resource 822 and/or the responding resource 824. Continuing the illustrative example, the smart terms engine can determine that the initiating resource 822 is associated with the Seller universal smart terms category, and automatically generate the smart terms according to the predetermined rules of the Seller category, as described above.

After both the initiating resource 822 and the responding resource 824 have accepted the smart terms (optionally, after one or more rounds of revisions), the dynamic modeling system 810 can write the smart terms to a distributed ledger of the dynamic modeling system 810 (step 804). That is, once accepted, the set smart terms can be recorded to the distributed ledger in a task chain contract.

For example, the dynamic modeling system 810 can write to the distributed ledger using a distributed ledger engine 816, as described above. Any resource of the transaction, e.g., the initiating resource 822, the responding resource 824, or another resource associated with the transaction, can subsequently read from the distributed ledger to determine the smart terms.

Each time a new resource or institution is added to the dynamic modeling system 810, the dynamic modeling system 810 can automatically generate a ledger ID for the new resource or institution, that identifies the resource or institution in the distributed ledger of the dynamic modeling system 810.

When smart terms are written to the distributed ledger, the new record can include the respective ID of each resource associated with the transaction (i.e., the ID of the initiating resource 822 and the responding resource 824, and any other resources associated with the transaction, e.g., insurance resources, surveyor resources, manufacturer resources, etc). The new record an also include an order ID associated with the transaction, and/or an item ID for the product being sold in the transaction.

During an execution resource interaction 830, the executing resource 832 of the transaction (i.e., the responding resource 824 or another resource 824 to which the responding resource 824 subcontracted the transaction) executes the request of the initiating resource 822 (step 805).

After execution of the transaction has been completed, the rule monitor 818 can process contextual dynamic data of the transaction to determine whether there is a discrepancy between i) the execution of the transaction and ii) the smart terms of the transaction as written to the distributed ledger (step 806). That is, during the execution of the transaction in step 805, the executing resource 832 and/or the dynamic modeling system 810 can generate dynamic contextual data that represents the execution, and associate the dynamic contextual data with the transaction. The rule monitor 818 can then read the smart terms from the distributed ledger and compare the smart terms with the dynamic contextual data to identify one or more discrepancies.

Continuing the above illustrative example, the rule monitor 818 can determine that the volume of the product provided by the initiating resource 822 is different from the volume of the product promised by the initiating resource 822 in the smart terms; that is, the initiating resource 822 has under-delivered relative to the smart terms codified in the distributed ledger.

In response to identifying no discrepancies, the dynamic modeling system 810 can determine to end the transaction, and exit the data flow 800.

In response to identifying one or more discrepancies, an execution smart assistant 817 of the dynamic modeling system 810 can notify one or more respective resources of the transaction about the discrepancy (step 807). In response to the discrepancies, the execution smart assistant 817 can generate smart claim options that could be pursued by the smart claim beneficiary. That is, the event of an rule-monitor-detected discrepancy, or a resource generated action, the dynamic modeling system 810 can return the applicable smart claims depending on the set smart terms derived from the T-Tasks via the execution smart assistant 817 based on the universal smart terms categories.

For example, in the above example where the initiating resource 822 under-delivered relative to the smart terms, the smart assistant can notify the responding resource 824 of the discrepancy, e.g., using a notification C-task.

The execution smart assistant 817 can identify, to the resource, the possible claims that can be filed in response to the discrepancy. For example, the execution smart assistant 817 can identify the one or more other resources of the dynamic modeling system 810 against whom a claim can be filed, as well as the parameters of the claim specified by the smart terms written to the distributed ledger. As a particular example, the execution smart assistant 817 can notify the responding resource 814 that the responding resource may request a refund from the initiating resource 822 for the difference between the volume of product that was agreed to and the volume of product that was delivered. Instead or in addition, the execution smart assistant 817 can notify the responding resource 824 that the responding resource may request that the difference between the volume of product that was agreed to and the volume of product that was delivered be shipped to the responding resource 824 by the initiating resource 822.

The execution smart assistant 817 can include an option for the resource to initiate a claim, e.g., by providing an input option in a dynamic smart interface of the dynamic modeling system 810.

In response to the resource selecting to initiate a claim, the dynamic modeling system 810 can generate a claim M-task 819 for one or more users of the transaction (step 808). A claim M-task is a task of the dynamic modeling system 810 that allows a resource to generate or respond to a claim.

Continuing the above illustrative example, the dynamic modeling system 810 can generate a claim M-task 819 assigned to the responding resource 824. The claim M-task 819 can prompt the responding resource 824 to provide any dynamic contextual data required to initiate the claim. For example, the claim M-task 819 can prompt the responding resource 824 to select a particular option from a set of multiple options (e.g., to select either to receive a refund or to receive a new shipment).

Instead or in addition, e.g., in response to the responding resource 824 submitting a claim against the initiating resource 822 through a T-task, the dynamic modeling system 810 can generate a claim M-task 819 assigned to the initiating resource 822. The claim M-task 819 can prompt the initiating resource 822 to provide any dynamic contextual data required to respond to the claim filed against the initiating resource 822. For example, the claim M-task 819 can prompt the initiating resource 822 to either confirm the request from the responding resource 824 (e.g., to agree to pay the refund or to send the new shipment), or to dispute the claim.

In some implementations, the resources of the transaction can identify that there is a discrepancy, and generate a claim M-task in response. That is, because each resource has access to the smart terms written to the distributed ledger, each resource can obtain the smart terms and compare them to the contextual dynamic data generated during execution to identify discrepancies.

At any stage of the transaction, if any task of a transaction is subcontracted to one or more third party resources of the dynamic modeling system 810 (e.g., as described above with reference to FIG. 7), the set smart terms and claims can automatically transfer over to the subcontracted transaction, and can be auto-reconciled by the dynamic modeling system 810 to ensure that the smart terms beneficiary and issuers can always be identified and are linked to the applicable smart terms and associated smart claims without any manual reconciliation.

Figure 9:
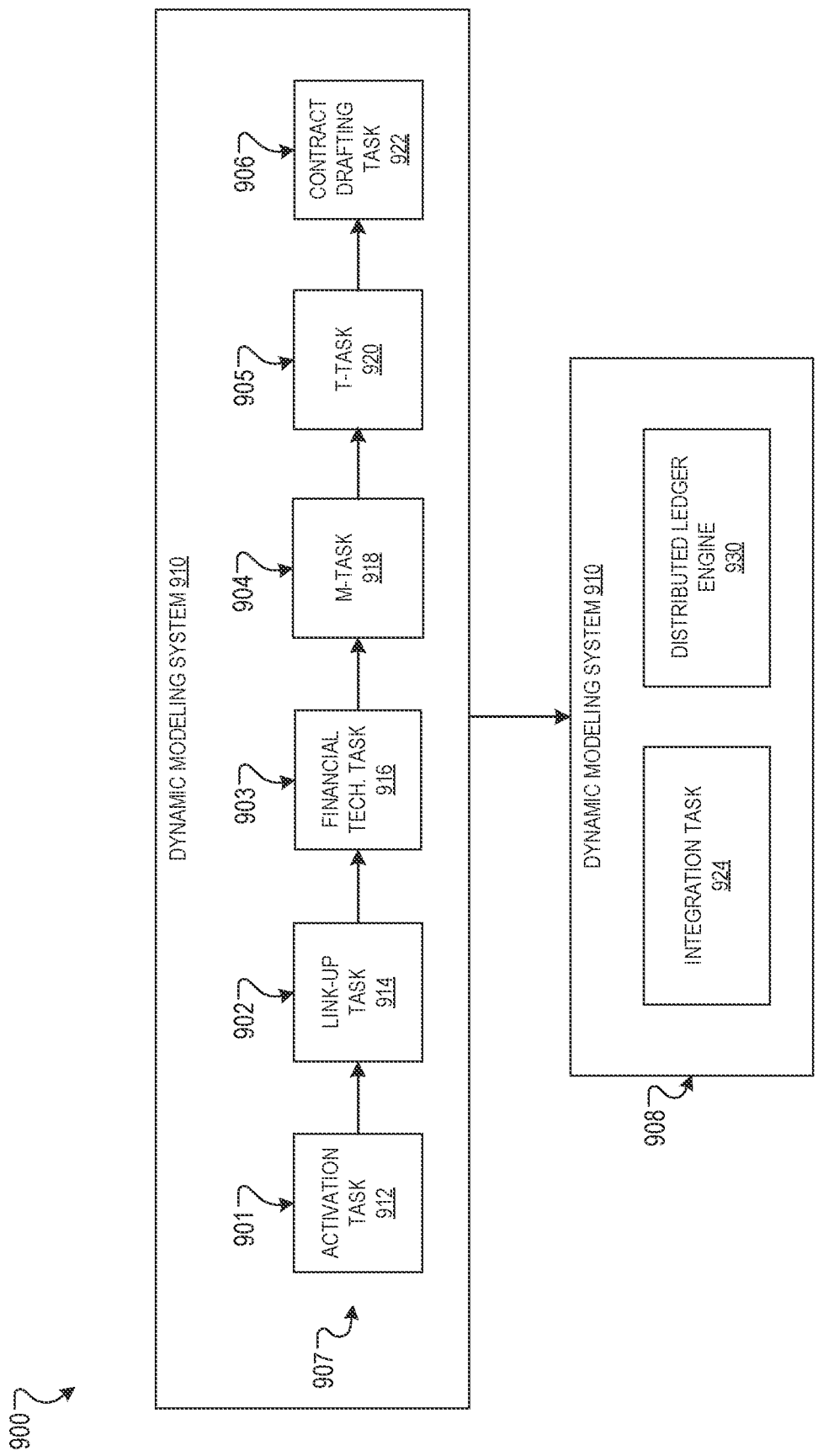
FIG. 9 is a block diagram of an example data flow whereby a resource of a dynamic modeling system completes tasks of different types.

FIG. 9 is a block diagram of an example data flow 900 for a resource of a dynamic modeling system 910 to complete tasks of different types in a task chain and write contextual data related to the completed tasks to a distributed ledger. The dynamic modeling system 910 can be, for example, configured similarly to the dynamic modeling system 110 described above.

To join the platform of the dynamic modeling system 910, the resource completes an activation task 912 (step 901). The activation task (A-Task) 912 establishes the institution corresponding to the resource as a resource of the dynamic modeling system 910. Completing the A-Task 912 can include providing information about the institution that is necessary for joining the platform.

When the resource completes the A-Task 912, the dynamic modeling system 910 can provide the resource with i) an identification by which the resource will be known on the dynamic modeling system 910, and ii) a key for the distributed ledger of the dynamic modeling system 910 corresponding to the resource. The dynamic modeling system 910 can place the information provided during the A-Task 912 into the distributed ledger.

In some implementations, the dynamic modeling system 910 maintains two sets of resources: a private set of resources and a public set of resources. Each resource in the public set of resources can be listed in a public catalog and therefore can be identified by any other resource of the dynamic modeling system 910, e.g., using a search function of the dynamic modeling system 910. Each resource in the private set of resources cannot be identified by other resources, e.g., using the search function. In some such implementations, for a resource to be added to the public catalog, the resource must be verified by the dynamic modeling system, e.g., using one or more of the verification documents discussed below with respect to the link-up task 914.

In some implementations, a user can join the platform by completing an A-Task, and designate a different resource of the dynamic modeling system 910 to complete the tasks assigned to the user. For example, the user might be in a location that does not have internet access. In some such implementations the dynamic modeling system 910 can provide a key to the user, and the user can assign the key to the other resource that will complete tasks on behalf of the user.

To connect with a different resource of the dynamic modeling system 910, the resource completes a link-up task 914 (step 902). The resource can complete a different link-up task (L-Task) 914 for each other resource of the dynamic modeling system 910 with which the resource will complete a transaction. Completing the L-Task 914 can include verifying the identity of the resource. For example, the resource can submit incorporation documents of the institution. The dynamic modeling system 910 can use the provided information to confirm the legitimacy of the resource. After the completion of the L-Task 914, the dynamic modeling system 910 can provide each resource a new key that identifies the verified link between the respective resources. The dynamic modeling system 910 can place all the information provided by either resource during their respective L-Tasks 914 into the distributed ledger.

To confirm their own financial status with the dynamic modeling system 910, as well as the financial status of the different resource of the dynamic modeling system 910, the resource of the institution completes a financial technology task 916 (step 903). Completing the financial technology task (FT-Task) 916 can include providing information about the bank accounts and any other relevant financial assets of the resource to the dynamic modeling system 910 for confirmation.

The architecture of the dynamic modeler allows the generation of a task chain contract, which includes data corresponding to tasks of multiple different task types in a task chain (e.g., the task chain 907) that have been initiated by different resources generating the required data. The task chain contract can be viewed by the corresponding resources of the dynamic modeler and an associated FT-institution as may be required, to validate and execute payment if all regulations and agreed smart terms are met, based on the unique task chain sequence which can be retrieved from the distributed ledger. The task chain contract itself can then posted to distributed ledger. In some implementations, each task in the task chain is "paperless", i.e., can be completed without printing any data onto physical sheets of paper.

The dynamic modeling system 910 can generate an FT-Task when an institution of the dynamic modeling system 910 needs to link their bank account or crypto wallet to the platform of the dynamic modeling system 910 in order to transact. In particular, the FT-Task is designed to integrate the platform with a financial institution.

The institution can initiate a first FT-Task and provide, e.g., the bank name and account number held with the corresponding financial institution (FT-institution). The institution can also provide the contact information for a particular representative of the FT-institution.

When a resource of the institution submits a dynamic final event for the first FT-Task, the dynamic modeling system 910 can generate a second FT-Task and assign the second FT-Task to the representative of the FT-institution. The second FT-Task can be generated according to the contextual dynamic data provided by the resource during the first FT-Task, and can include instructions to provide further information about the FT-institution so that the dynamic modeling system can link the FT-institution to the platform. This link-up process can also be called "mapping integration". In some implementations, the representative of the FT-institution can reassign the second FT-Task to an IT Team or back-office delegate of the FT-institution to complete the required mapping integration.

When a resource of the FT-institution submits a dynamic final event for the second FT-Task, the dynamic modeling system 910 can generate a link between the institution with the FT-institution, and determine that the link is "active." A link is "active" when both the institution and the FT-institution are both active participants in the transaction. If more integration data is required before an active link can be created, the dynamic modeling system 910 can generate subsequent FT-Tasks that identify the required integration data until the mapping integration is complete.

In some implementations, after the mapping integration is complete, resources of the institution can access a live view on the account balances of the institution, e.g., via a dynamic smart interface of the dynamic modeling system 910.

In some implementations, after the mapping integration is complete, resources of the institution can initiate transaction payments using the dynamic modeling system 910, i.e., payments from the FT-institution to other resources of the dynamic modeling system 910 for transactions of the dynamic modeling system 910. For example, the resources of the institution can initiate transaction payments via an FT-Task API provided by the dynamic modeling system 910.

When the mapping integration is complete, the dynamic modeling system 910 can generate a unique key that is shared with the institution and FT-institution and that identifies the link between the institution and the FT-institution. The unique key can include a current status of the link (e.g., active or inactive). Therefore, when an M-task is generated for a transaction of the institution, the dynamic modeling system 910 can determine all active FT-institution accounts related to the institution, and issue an instruction to the one or more of the active FT-institutions to debit or credit the corresponding account. To complete the M-Task, the dynamic modeling system 910 can require each institutions related to the M-Task (e.g., the institution and the FT-institution) to have a status that is active. In some cases, the financial technology task 916 is called a "fintech" task.

To begin a transaction with the different resource of the dynamic modeling system 910, the resource of the institution completes an M-Task 918 (step 904). As described above, completing the M-Task 918 can include submitting a final event that includes contextual dynamic data for generating the transaction.

To establish smart terms for the transaction with the different resource of the dynamic modeling system 910, the resource completes a T-Task 920 (step 905). As described above, the dynamic modeling system 910 can use the contextual dynamic data provided during the T-Task to automatically generate the smart terms for the transaction.

To generate a contract for the transaction with the different resource of the dynamic modeling system 910, the resource completes a contract drafting task 922 (step 906). In some cases, the resources of the transaction may require a contract to be drafted by attorneys of the resources, in addition to the smart terms automatically generated by the dynamic modeling system 910. For example, if a monetary value of the transaction exceeds a threshold, the resources can require a contract to be drafted. In these cases, the dynamic modeling system 910 can generate a contract drafting task (CD-Task) 922 and assign the CD-Task 922 to the appropriate users of the respective institutions. In some implementations, the resource can elect for a CD-Task 922 to be automatically generated for each transaction with which the resource is associated. Instead or in addition, the resource can elect that a CD-Task 922 not be generated for any transaction.

As described above with respect to the T-Tasks of FIG. 8, completing the CD-Task 922 can include one or more rounds of negotiation between the resources of the transaction. At each round, a respective resource can revise the terms of the contract, and the dynamic modeling system 910 can generate a decision CD-Task for the other resource of the transaction to either accept, reject, or revise the revisions submitted by the resource.

At any step 901-906, the resource can complete one or more C-Tasks associated with the respective task of the step. That is, C-Tasks can be sub-tasks of any other task of the dynamic modeling system 910, e.g., L-Tasks, F-Tasks, T-Tasks, CD-Tasks, etc.

After the completion of the CD-Task 922, i.e., after the transaction has been initiated by the institution, the dynamic modeling system 910 can issue an instruction to the corresponding FT-institution that can include the context of the M-Task 918 and all other tasks related to the transaction (e.g., the T-Task 920, the CD-Task 922, and any C-Task related to the transaction). This context can enable the FT-Institution to have a live view of a current status of the transaction. Subject to the smart terms agreed upon by the resources of the transaction, the FT-institution can reject or confirm payments related to the transaction. The FT-institution can also respond to credit term requests related to the transaction. The dynamic modeling system 910 can also request that the FT-Institution reconcile the transaction instruction with the recorded M-Task 918.

After the FT-institution has approved the completion of the transaction, the dynamic modeling system 910 can write one or more task chain contracts to the distributed ledger using an integration task 924 (step 908). An integration task of the dynamic modeling system 910 is a task that is completed to integrate multiple sources of dynamic contextual data into a single record, e.g., in order to store the record in a distributed ledger. An integration task can be completed by an API associated with the platform.

The dynamic modeling system 910 can use the integration task 924 to write contextual dynamic data related to the distributed ledger in a dynamic way. For example, the records written to the distributed ledger can depend on the type of task completed; i.e., the type of task can determine what dynamic contextual data is to be saved to the distributed ledger. That is, the type of task can determine how the task chain contract is generated and saved to the distributed ledger.

In particular, the dynamic modeling system 910 can first generate, during a first final event, the task chain contract by saving every required item of contextual dynamic data generated by respective tasks at preceding steps in the task chain 907 to a single data object. The dynamic modeling system can use the contextual dynamic data to determine how to combine the data corresponding to respective different task types into a single data object, e.g., in a sequence of data items within the data object corresponding to the sequence in which the tasks were completed.

The dynamic modeling system 910 can then process the generated task chain contract to determine that each required item of contextual dynamic data is recorded. Each required item of contextual dynamic data can be associated with a task of a particular type, as described above. If one or more required items of data are not recorded in the task chain contract, then the dynamic modeling system 910 will not write the task chain contract to the distributed ledger, but instead will execute one or more reconciliation processes in order to determine the required items of data. For example, if a task of a particular type is not recorded in the task chain contract (e.g., if no T-Task is recorded in the task chain contract), then the dynamic modeling system 901 can generate a notification that the task of the particular type is missing.

In some implementations, the dynamic modeling system 910 can validate the generated task chain contract using a "minimum task chain threshold" that identifies the items of contextual dynamic data that are required to be a part of the task chain contract for the task chain contract to be written to the distributed ledger. That is, the minimum task chain threshold identifies the minimum quantity and type of data that is required in order to save a task chain contract to a distributed ledger. For example, the minimum task chain threshold might require that a data element corresponding to each of the above-described task types be included in the task chain contract, representing that a respective task of each task type in the task chain has been completed and thus that the transaction can continue.

As a particular example, the minimum contextual threshold can identify a different threshold, i.e., a different quantity and type of contextual dynamic data, corresponding to each task type. For example, the minimum contextual threshold corresponding to a T-Task can require that each field of the T-Task be represented in the task chain contract with either a "yes" (i.e., confirm) or a "no" (i.e., decline).

After the completion of the first final event, i.e., after the dynamic modeling system 910 has determined that every required item of contextual dynamic data is recorded in the task chain contract, the dynamic modeling system 910 can write, using a second final event, the task chain contract to the distributed ledger, for future reference by each resource associated with the transaction.

The records written to the distributed ledger are always linked to the institution of the transaction, and the type of the institution.

The dynamic modeling system 910 can use the integration task 924 to link the contextual dynamic data of each task in the task chain 907, i.e., the A-Task 912, the L-Task 914, the FT-Task 916, the M-Task, 918, the T-Task 920, and the CD-Task 922, to build the unique task chain contracts that will be written to the distributed ledger. The task chain contracts within the distributed ledger can enable the institution to know i) what has occurred at each stage of the transaction, ii) what needs to happen in upcoming tasks of the transaction, and ii) in the event of a discrepancy, what the next escalation should be, according to the smart terms and/or the contract determined during the transaction. In other words, the dynamic modeling system 910 generates the task chain contracts written to the distributed ledger in a dynamic way depending on the Task type which determines what is to be saved to the distributed ledger, but which is always linked to the Institution (and institution type).

In some implementations, instead of, or in addition to, writing the task chain contracts to the distributed ledger, the dynamic modeling system 910 can write the task chain contracts to a database system, e.g., a third-party database associated with one or more of the institutions of the transaction.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter include computer systems, apparatus, and computer programs recorded on one or more computer storage devices, each configured to perform the actions of the described methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method of generating a task chain contract comprising contextual dynamic data generated by a dynamic modeling system during execution of a plurality of tasks in a task chain of a transaction, wherein each of the plurality of tasks has a respective task type of a plurality of task types, wherein the plurality of task types includes one or more of a main task type, a communication task type, an activation task type, a link-up task type, a fintech task type, a terms task type, or a contract drafting task type;

wherein the generated task chain contract can be applied to an application and comprises information about the transaction required by respective resources of the dynamic modeling system that are associated with the transaction;

wherein the dynamic modeling system is configured to generate, for all applications, i) a single shared first event and ii) a single shared final event, powered by an application's context and based on a user event triggering a dynamic process manager to auto-generate next tasks in a sequence of tasks of the transaction, wherein the dynamic modeling system having a single dynamic first event/single dynamic final event and intelligent resource interaction, combined with its shared standard transaction parameters including set or revised terms, a resource profile, and a transaction identifier, enables a constant creation of a single common task chain contract bound to a unique identifier of and for the task chain contract to be saved to a distributed ledger, the method comprising:

obtaining, from a user device and in response to an activation task of the dynamic modeling system, first contextual dynamic data identifying one or more attributes of a new resource of the dynamic modeling system;

generating a new identification for the new resource and a new distributed ledger key for the distributed ledger of the dynamic modeling system;

obtaining, from a second user device and in response to a link-up task of the dynamic modeling system, second contextual dynamic data verifying an identity of the new resource and identifying a second resource of the dynamic modeling system with which the new resource is initiating a transaction;

obtaining, from a third user device and in response to a fintech task of the dynamic modeling system, third contextual dynamic data comprising fintech data of the new resource;

generating, using an integration task of the dynamic modeling system, the task chain contract that includes respective contextual dynamic data corresponding to each task in the task chain, including the first contextual dynamic data, the second contextual dynamic data, and the third contextual dynamic data;

determining that all required contextual dynamic data from each task of the transaction is included in the task chain contract; and writing the task chain contract to a segment of the distributed ledger corresponding to the new resource.

Embodiment 2 is the method of embodiment 1, wherein determining that all required contextual dynamic data from each task in the task chain of the transaction is included in the task chain contract comprises comparing the task chain contract with a predetermined minimum task chain threshold.

Embodiment 3 is the method of any one of embodiments 1 or 2, wherein:

transactional contextual dynamic data corresponding to a transaction of the new resource is approved by an FT-institution associated with the new resource, wherein the transactional contextual dynamic data comprises data characterizing each task of the transaction, and wherein the FT-institution is identified during the fintech task of the dynamic modeling system.

Embodiment 4 is a method of using smart terms of a transaction of a dynamic modeling system to reconcile discrepancies in the transaction, wherein each smart term can be linked with a warrantor resource and a beneficiary resource of the dynamic modeling system at any stage of the transaction to resolve a discrepancy, the method comprising:

receiving dynamic contextual data characterizing to the transaction, wherein the transaction is associated with a first resource and a second resource of the dynamic modeling system;

automatically generating, in response to the dynamic contextual data, a T-Task for establishing the smart terms for the transaction and assigning the T-Task to the first resource;

providing, to the first resource, a dynamic smart interface for completing the T-Task;

generating, in response to the completion of the T-Task, a decision C-Task for accepting, rejecting, or revising the smart terms generated during the T-Task, and assigning the decision C-Task to the second resource;

providing, to the second resource, a dynamic smart interface for completing the decision C-Task;

writing a smart chain contract that includes the smart terms to a distributed ledger of the dynamic modeling system;

receiving second dynamic contextual data identifying a state of execution of the transaction between the first resource and the second resource;

automatically determining a discrepancy between i) the second dynamic contextual data and ii) the smart terms written to the distributed ledger; and generating, in response to the discrepancy, an M-task for addressing the discrepancy, and assigning the M-task to the first resource or the second resource, wherein the M-task is assigned to a beneficiary resource of the dynamic modeling system that is able to generate a claim in response to the discrepancy according to the smart terms recorded in the Task Chain Contract of the transaction.

Embodiment 5 is the method of embodiment 4, wherein automatically generating the T-Task comprises generating the T-Task according to a universal smart terms category associated with the first resource or the second resource.

Embodiment 6 is the method of any one of embodiments 4 or 5, wherein generating the M-task comprises automatically determining, according to the smart terms written to the distributed ledger, the particular resource of the dynamic modeling system against which to file the claim.

Embodiment 7 is a method comprising:

receiving, at a dynamic modeling system, a first dynamic input request with corresponding contextual inputs comprising data characterizing a single dynamic first event of a main task;

generating, in response to the first dynamic input request, a dynamic smart interface responding to the contextual inputs;

generating, in response to the first dynamic input request, a model comprising a single shared dynamic control load and dynamic data load responding to the contextual inputs;

receiving, at the dynamic modeling system, a second dynamic input request comprising data characterizing a single dynamic final event of the main task;

triggering, in response to the second dynamic input request, a run-time task interface that identifies one or more dynamic options based on (i) a rule monitor of the dynamic modeling system and (ii) contextual dynamic data of the main task, wherein the run-time task interface is triggered in response to each final event of the dynamic modeling system, and wherein the dynamic options comprise one or more of:

completing one or more mandatory tasks associated with the main task, wherein the one or more mandatory tasks comprise one or more of a terms task, a contract drafting task, for a fintech task;

completing one or more child tasks that are dependent on the main task, wherein the one or more child tasks comprise one or more communicator tasks; and initiating one or more new tasks of the dynamic modeling system that are related to the main task; and responsive to a user input to the run-time task interface selecting a particular task identified by the run-time task interface, obtaining contextual dynamic data of the selected task and executing the selected task using the obtained contextual dynamic data.

Embodiment 8 is a method comprising:

receiving, at a dynamic modeling system, a dynamic input request comprising data characterizing a single dynamic final event of a main task, wherein the main task is associated with a transaction of the dynamic modeling system;

automatically detecting, by the rule monitor, one or more discrepancies in the single dynamic final event of the main task, according to one or more established rules of the dynamic modeling system;

generating, in response to the one or more discrepancies and by a rule monitor of the dynamic modeling system, a run-time task interface that identifies one or more dynamic options for responding to the one or more discrepancies, comprising:

automatically generating, by the rule monitor, a new child task of the main task for addressing the one or more discrepancies; and automatically determining, by the rule monitor and based on a task chain contract, a recipient resource of the new child task, wherein the task chain contract comprises contextual dynamic data for each task in a chain of tasks associated with the transaction of the main task;

sending, to the recipient resource, data characterizing the run-time task interface;

receiving, from the recipient resource, data characterizing the completed child task, wherein the recipient resource has completed the communicator task comprising selecting whether to generate a claim against a second resource of the dynamic modeling system in response to the discrepancies; and automatically validating, by the rule monitor, one or more fields of the completed child task, comprising:

if the recipient resource has selected to generate a claim, generating a second main task corresponding to the claim against the second resource.

Embodiment 9 is the method of embodiment 8, further comprising automatically identifying, by the rule monitor and based on the task chain contract, a next resource for continuing the transaction of the main task.

Embodiment 10 is a method comprising:

receiving a first dynamic input request with corresponding contextual inputs comprising data characterizing a single dynamic first event of a main task of a transaction of a dynamic modeling system;

determining, using a task chain contract associated with the transaction, whether an authentication task is required for the main task;

if determining that an authentication task is required, obtaining unique identification data of a first user associated with the main task using a run-time task interface of the dynamic modeling system;

authenticating the first user using the unique identification data, comprising comparing i) the unique identification data and ii) a resource profile of the first user that is included in a second task chain contract associated with the first user;

generating, in response to the first dynamic input request, a dynamic smart interface responding to the contextual inputs;

generating, in response to the first dynamic input request, a model comprising a single shared dynamic control load and dynamic data load responding to the contextual inputs;

receiving a second dynamic input request comprising data characterizing a single dynamic final event of the main task;

triggering, in response to the second dynamic input request, a dynamic process comprising a rule monitor, a smart task generator, and a task chain contract; and presenting, to a second user in response to the second dynamic input request, dynamic rule options comprising one or more of rejecting, approving, escalating, snoozing, or reassigning the main task.

Embodiment 11 is the method of embodiment 10, wherein the unique identification data includes one or more of automatic facial recognition or biometric input.

Embodiment 12 is the method of any one of embodiments 10 or 11, wherein the unique identification data required for the first user depends on an assigned role of the first user or applications the first user has access to, the method further comprising:

determining a change in either the role of the first user or the applications the first user has access to;

determining which types of unique identification data is required responsive to the determined change; and generating a communicator task by the rule monitor to collect any needed identification data from the first user.

Embodiment 13 is the method of any one of embodiments 10-12, further comprising:

generating, prior to receiving the second dynamic input request, a communicator task associated with the main task, wherein the communicator task comprises an automatic prompt to re-validate the unique identifier of the first user.

Embodiment 14 is the method of any one of embodiments 10-13, wherein presenting dynamic rule options comprises:

automatically detecting, by the rule monitor and based on the task chain contract, one or more discrepancies in the single dynamic final event of the main task, according to one or more established rules of the rule modeling system;

selecting, by the rule monitor and based on the task chain contract, the one or more dynamic rule options for presentation to the first user; and presenting the selected dynamic rule options to the second user.

Embodiment 15 is one or more non-transitory computer storage media encoded with a computer program, the program comprising instructions that are operable, when executed by data processing apparatus, to cause the data processing apparatus to perform the method of any one of embodiments 1 to 14.

Embodiment 16 is a system comprising: one or more computers and one or more storage devices storing instructions that are operable, when executed by the one or more computers, to cause the one or more computers to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of generating a task chain contract comprising contextual dynamic data generated by a dynamic modeling system during execution of a plurality of tasks in a task chain of a transaction,
    wherein each of the plurality of tasks has a respective task type of a plurality of task types, wherein the plurality of task types includes one or more of a main task type, a communication task type, an activation task type, a link-up task type, a fintech task type, a terms task type, or a contract drafting task type;
    wherein the generated task chain contract can be applied to an application and comprises information about the transaction required by respective resources of the dynamic modeling system that are associated with the transaction;
    wherein the dynamic modeling system is configured to generate, for all applications, i) one or more single shared first events, ii) a shared dynamic cascading filter, and iii) one or more single shared final events, using an application's context and based on a user event triggering a dynamic process manager to auto-generate i) next tasks in a sequence of tasks of the transaction and ii) their correspondent resources, to provide set standardized collaboration on a single integrated-solution platform,
    wherein features of the dynamic modeling system include i) a dynamic smart interface, ii) dynamic interaction types, iii) the dynamic process manager, iv) contextual dynamic data, and v) a dynamic output viewer,
    wherein the dynamic modeling system having a single dynamic first event/single dynamic final event and intelligent resource interaction, combined with its shared standard transaction parameters including set or revised terms, a resource profile, and a transaction identifier, enables a constant creation of a single common task chain contract bound to a unique identifier of and for the task chain contract to be saved to a distributed ledger,
    the method comprising:
    obtaining, from a user device and in response to an activation task of the dynamic modeling system, first contextual dynamic data identifying one or more attributes of a new resource of the dynamic modeling system;
    generating a new identification for the new resource and a new distributed ledger key for the distributed ledger of the dynamic modeling system;
    obtaining, from a second user device and in response to a link-up task of the dynamic modeling system, second contextual dynamic data verifying an identity of the new resource and identifying a second resource of the dynamic modeling system with which the new resource is initiating a transaction;
    obtaining, from a third user device and in response to a fintech task of the dynamic modeling system, third contextual dynamic data comprising fintech data of the new resource;
    generating, using an integration task of the dynamic modeling system, the task chain contract that includes respective contextual dynamic data corresponding to each task in the task chain, including the first contextual dynamic data, the second contextual dynamic data, and the third contextual dynamic data;
    determining that all required contextual dynamic data from each task of the transaction is included in the task chain contract; and
    writing the task chain contract to a segment of the distributed ledger corresponding to the new resource.

2. The method of claim 1, wherein determining that all required contextual dynamic data from each task in the task chain of the transaction is included in the task chain contract comprises comparing the task chain contract with a predetermined minimum task chain threshold.

3. The method of claim 1, wherein:
    transactional contextual dynamic data corresponding to a transaction of the new resource is approved by an FT-institution associated with the new resource, wherein the transactional contextual dynamic data comprises data characterizing each task of the transaction, and wherein the FT-institution is identified during the fintech task of the dynamic modeling system.

4. A method of using smart terms of a transaction of a dynamic modeling system to reconcile discrepancies in the transaction, wherein each smart term can be linked with a warrantor resource and a beneficiary resource of the dynamic modeling system at any stage of the transaction to resolve a discrepancy,
    wherein the dynamic modeling system is configured to generate, for all applications, i) one or more single shared first events, ii) a shared dynamic cascading filter, and iii) one or more single shared final events, using an application's context and based on a user event triggering a dynamic process manager to auto-generate i) next tasks in a sequence of tasks of the transaction and ii) their correspondent resources, to provide set standardized collaboration on a single integrated-solution platform,
    and wherein features of the dynamic modeling system include i) a dynamic smart interface, ii) dynamic interaction types, iii) the dynamic process manager, iv) contextual dynamic data, and v) a dynamic output viewer, the method comprising:
receiving dynamic contextual data characterizing to the transaction, wherein the transaction is associated with a first resource and a second resource of the dynamic modeling system;
automatically generating, in response to the dynamic contextual data, a T-Task for establishing the smart terms for the transaction and assigning the T-Task to the first resource;
providing, to the first resource, the dynamic smart interface for completing the T-Task;
generating, in response to the completion of the T-Task, a decision C-Task for accepting, rejecting, or revising the smart terms generated during the T-Task, and assigning the decision C-Task to the second resource;
providing, to the second resource, the dynamic smart interface for completing the decision C-Task;
writing a smart chain contract that includes the smart terms to a distributed ledger of the dynamic modeling system;
receiving second dynamic contextual data identifying a state of execution of the transaction between the first resource and the second resource;
automatically determining a discrepancy between i) the second dynamic contextual data and ii) the smart terms written to the distributed ledger; and
generating, in response to the discrepancy, an M-task for addressing the discrepancy, and assigning the M-task to the first resource or the second resource, wherein the M-task is assigned to a beneficiary resource of the dynamic modeling system that is able to generate a claim in response to the discrepancy according to the smart terms recorded in the Task Chain Contract of the transaction.

5. The method of claim 4, wherein automatically generating the T-Task comprises generating the T-Task according to a universal smart terms category associated with the first resource or the second resource.

6. The method of claim 4, wherein generating the M-task comprises automatically determining, according to the smart terms written to the distributed ledger, the particular resource of the dynamic modeling system against which to file the claim.

7. A method comprising:
receiving, at a dynamic modeling system, a dynamic input request comprising data characterizing a single dynamic final event of a main task, wherein the main task is associated with a transaction of the dynamic modeling system,
wherein the dynamic modeling system is configured to generate, for all applications, i) one or more single shared first events, ii) a shared dynamic cascading filter, and iii) one or more single shared final events, using an application's context and based on a user event triggering a dynamic process manager to auto-generate i) next tasks in a sequence of tasks of the transaction and ii) their correspondent resources, to provide set standardized collaboration on a single integrated-solution platform,
and wherein features of the dynamic modeling system include i) a dynamic smart interface, ii) dynamic interaction types, iii) the dynamic process manager, iv) contextual dynamic data, and v) a dynamic output viewer;
automatically detecting, by the rule monitor, one or more discrepancies in the single dynamic final event of the main task, according to one or more established rules of the dynamic modeling system;
generating, in response to the one or more discrepancies and by a rule monitor of the dynamic modeling system, a run-time task interface that identifies one or more dynamic options for responding to the one or more discrepancies, comprising:
automatically generating, by the rule monitor, a new child task of the main task for addressing the one or more discrepancies; and
automatically determining, by the rule monitor and based on a task chain contract, a recipient resource of the new child task, wherein the task chain contract comprises contextual dynamic data for each task in a chain of tasks associated with the transaction of the main task;
sending, to the recipient resource, data characterizing the run-time task interface;
receiving, from the recipient resource, data characterizing the completed child task, wherein the recipient resource has completed the child task comprising selecting whether to generate a claim against a second resource of the dynamic modeling system in response to the discrepancies; and
automatically validating, by the rule monitor, one or more fields of the completed child task, comprising:
if the recipient resource has selected to generate a claim, generating a second main task corresponding to the claim against the second resource.

8. The method of claim 7, further comprising automatically identifying, by the rule monitor and based on the task chain contract, a next resource for continuing the transaction of the main task.

9. A method comprising:
receiving a first dynamic input request with corresponding contextual inputs comprising data characterizing a single dynamic first event of a main task of a transaction of a dynamic modeling system,
wherein the dynamic modeling system is configured to generate, for all applications, i) one or more single shared first events, ii) a shared dynamic cascading filter, and iii) one or more single shared final events, using an application's context and based on a user event triggering a dynamic process manager to auto-generate i) next tasks in a sequence of tasks of the transaction and ii) their correspondent resources, to provide set standardized collaboration on a single integrated-solution platform,
and wherein features of the dynamic modeling system include i) a dynamic smart interface, ii) dynamic interaction types, iii) the dynamic process manager, iv) contextual dynamic data, and v) a dynamic output viewer;
determining, using a task chain contract associated with the transaction, whether an authentication task is required for the main task;
if determining that an authentication task is required, obtaining unique identification data of a first user associated with the main task using a run-time task interface of the dynamic modeling system;
authenticating the first user using the unique identification data, comprising comparing i) the unique identification data and ii) a resource profile of the first user that is included in a second task chain contract associated with the first user;

generating, in response to the first dynamic input request, the dynamic smart interface responding to the contextual inputs;

generating, in response to the first dynamic input request, a model comprising a single shared dynamic control load and dynamic data load responding to the contextual inputs;

receiving a second dynamic input request comprising data characterizing a single dynamic final event of the main task;

triggering, in response to the second dynamic input request, a dynamic process comprising a rule monitor, a smart task generator, and a task chain contract; and presenting, to a second user in response to the second dynamic input request, dynamic rule options comprising one or more of rejecting, approving, escalating, snoozing, or reassigning the main task.

10. The method of claim 9, wherein the unique identification data includes one or more of automatic facial recognition or biometric input.

11. The method of claim 9, wherein the unique identification data required for the first user depends on an assigned role of the first user or applications the first user has access to, the method further comprising:

determining a change in either the role of the first user or the applications the first user has access to;

determining which types of unique identification data is required responsive to the determined change; and generating a communicator task by the rule monitor to collect any needed identification data from the first user.

12. The method of claim 9, further comprising:

generating, prior to receiving the second dynamic input request, a communicator task associated with the main task, wherein the communicator task comprises an automatic prompt to re-validate the unique identifier of the first user.

13. The method of claim 9, wherein presenting dynamic rule options comprises:

automatically detecting, by the rule monitor and based on the task chain contract, one or more discrepancies in the single dynamic final event of the main task, according to one or more established rules of the rule modeling system;

selecting, by the rule monitor and based on the task chain contract, the one or more dynamic rule options for presentation to the first user; and presenting the selected dynamic rule options to the second user.

* * * * *